April 18, 1939. H. A. THOMPSON Re. 21,054

RAILWAY TRAFFIC CONTROLLING APPARATUS

Original Filed Oct. 4, 1933 9 Sheets-Sheet 1

INVENTOR
Howard A. Thompson
BY
A. R. Vinell
HIS ATTORNEY

April 18, 1939. H. A. THOMPSON Re. 21,054

RAILWAY TRAFFIC CONTROLLING APPARATUS

Original Filed Oct. 4, 1933 9 Sheets-Sheet 2

INVENTOR
Howard A. Thompson
BY
HIS ATTORNEY

RAILWAY TRAFFIC CONTROLLING APPARATUS

Original Filed Oct. 4. 1933 9 Sheets-Sheet 3

INVENTOR
Howard A. Thompson
BY
A. R. Tunnell
HIS ATTORNEY

RAILWAY TRAFFIC CONTROLLING APPARATUS

Original Filed Oct. 4, 1933 9 Sheets-Sheet 4

INVENTOR

BY Howard A. Thompson

HIS ATTORNEY

RAILWAY TRAFFIC CONTROLLING APPARATUS

Original Filed Oct. 4, 1933 9 Sheets-Sheet 5

INVENTOR
Howard A. Thompson
BY
A. R. Venicill
HIS ATTORNEY

RAILWAY TRAFFIC CONTROLLING APPARATUS

Original Filed Oct. 4, 1933 9 Sheets-Sheet 6

INVENTOR
Howard A. Thompson
BY
A. A. Vinnill
HIS ATTORNEY

RAILWAY TRAFFIC CONTROLLING APPARATUS

Original Filed Oct. 4, 1933 9 Sheets-Sheet 7

INVENTOR
Howard A. Thompson
BY
A. R. Vinell
HIS ATTORNEY

RAILWAY TRAFFIC CONTROLLING APPARATUS

Original Filed Oct. 4. 1933 9 Sheets-Sheet 8

INVENTOR
Howard A. Thompson
BY
A. A. Tuttle
HIS ATTORNEY

RAILWAY TRAFFIC CONTROLLING APPARATUS

Original Filed Oct. 4, 1933 9 Sheets-Sheet 9

INVENTOR
Howard A. Thompson
BY A. R. Vincill
HIS ATTORNEY

Reissued Apr. 18, 1939

Re. 21,054

UNITED STATES PATENT OFFICE 21,054

RAILWAY TRAFFIC CONTROLLING APPARATUS

Howard A. Thompson, Edgewood, Pa., assignor to The Union Switch & Signal Company, Swissvale, Pa., a corporation of Pennsylvania Original No. 2,141,803, dated December 27, 1938, Serial No. 692,155, October 4, 1933. Application for reissue February 28, 1939, Serial No. 258,945

47 Claims. (Cl. 246—50)

My invention relates to railway traffic controlling apparatus, and particularly to apparatus for controlling a plurality of traffic governing devices such as switches and signals, or a plurality of other indicating devices, at one point, over a single pair of line wires by control apparatus at a second point.

My invention is particularly adapted for, although not limited to, the remote control and return indication of switches and signals, and the control of automatic signals each of which indicates traffic conditions four or more blocks in advance.

I will describe five forms of railway traffic controlling apparatus embodying my invention, and will then point out the novel features thereof in claims.

Figure 1A:
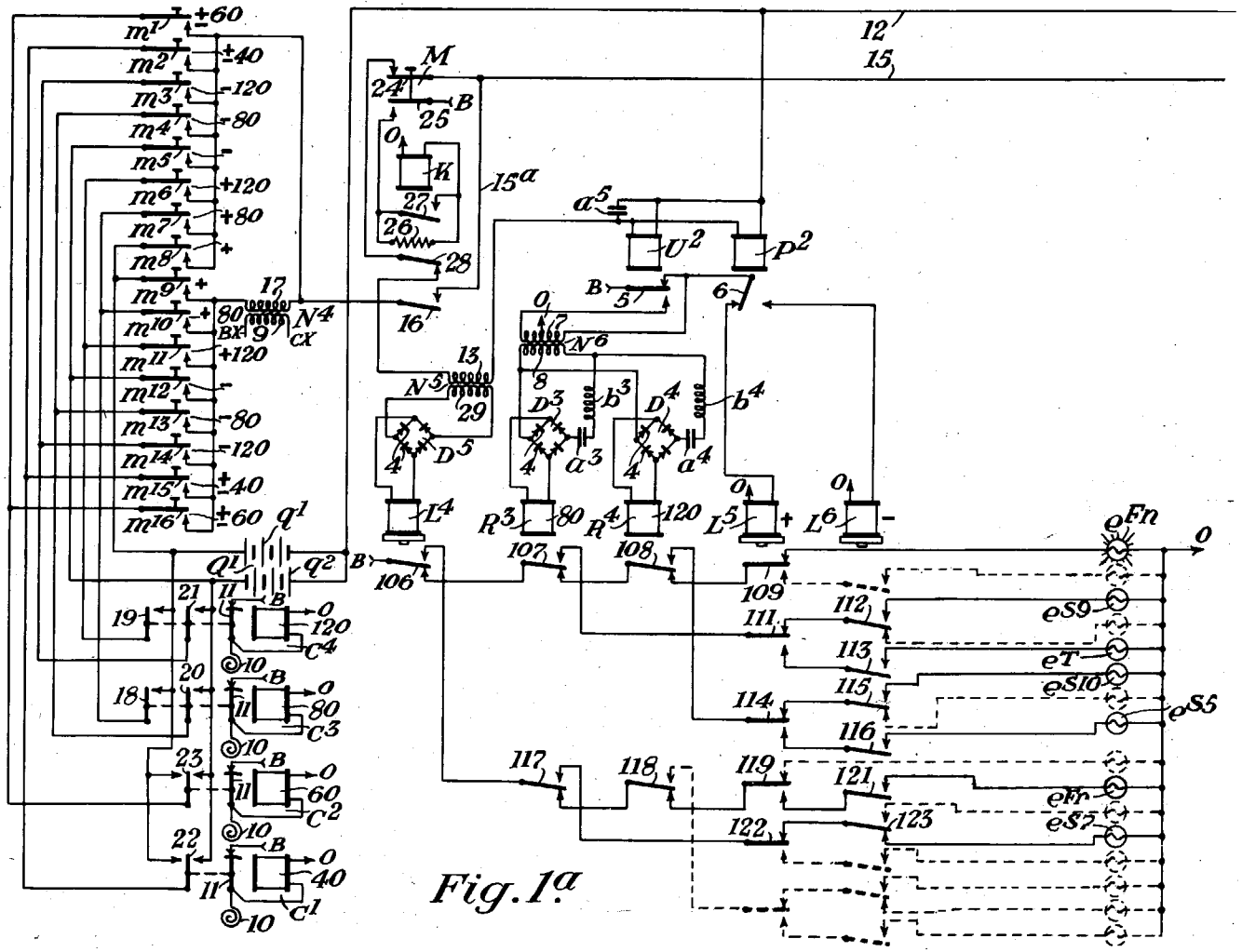
Figure 1B:
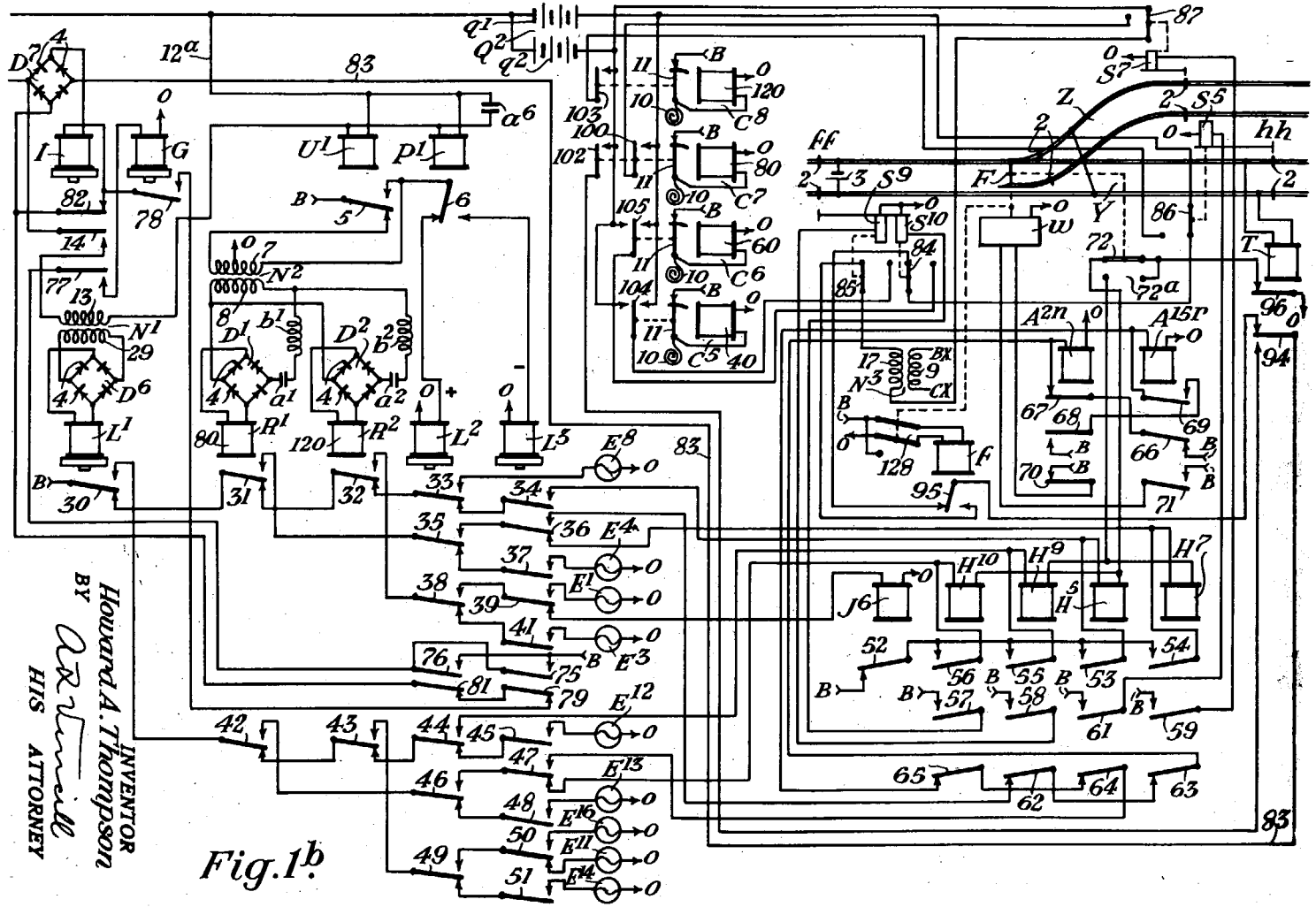
Figure 2A:
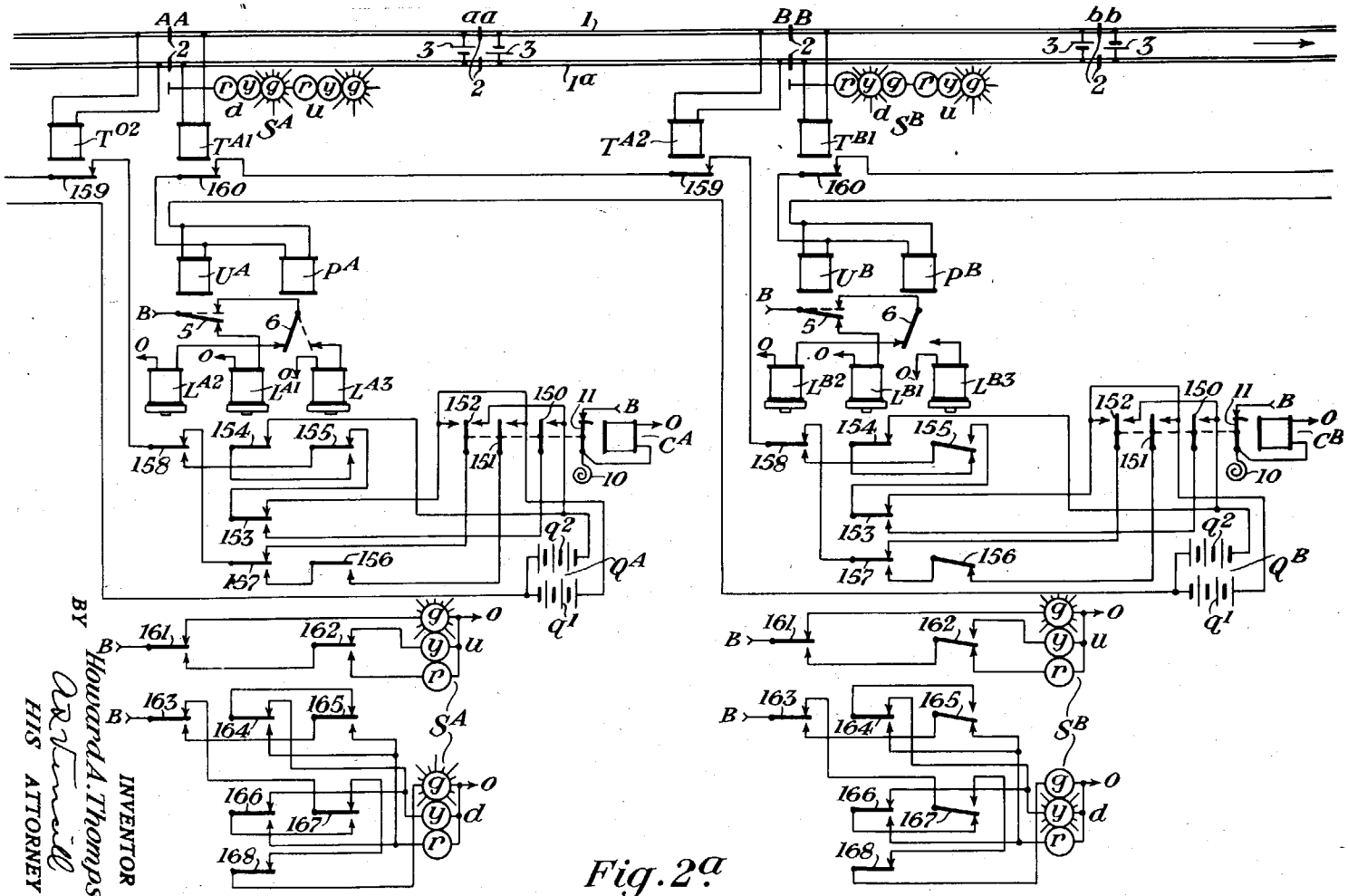
Figure 2B:
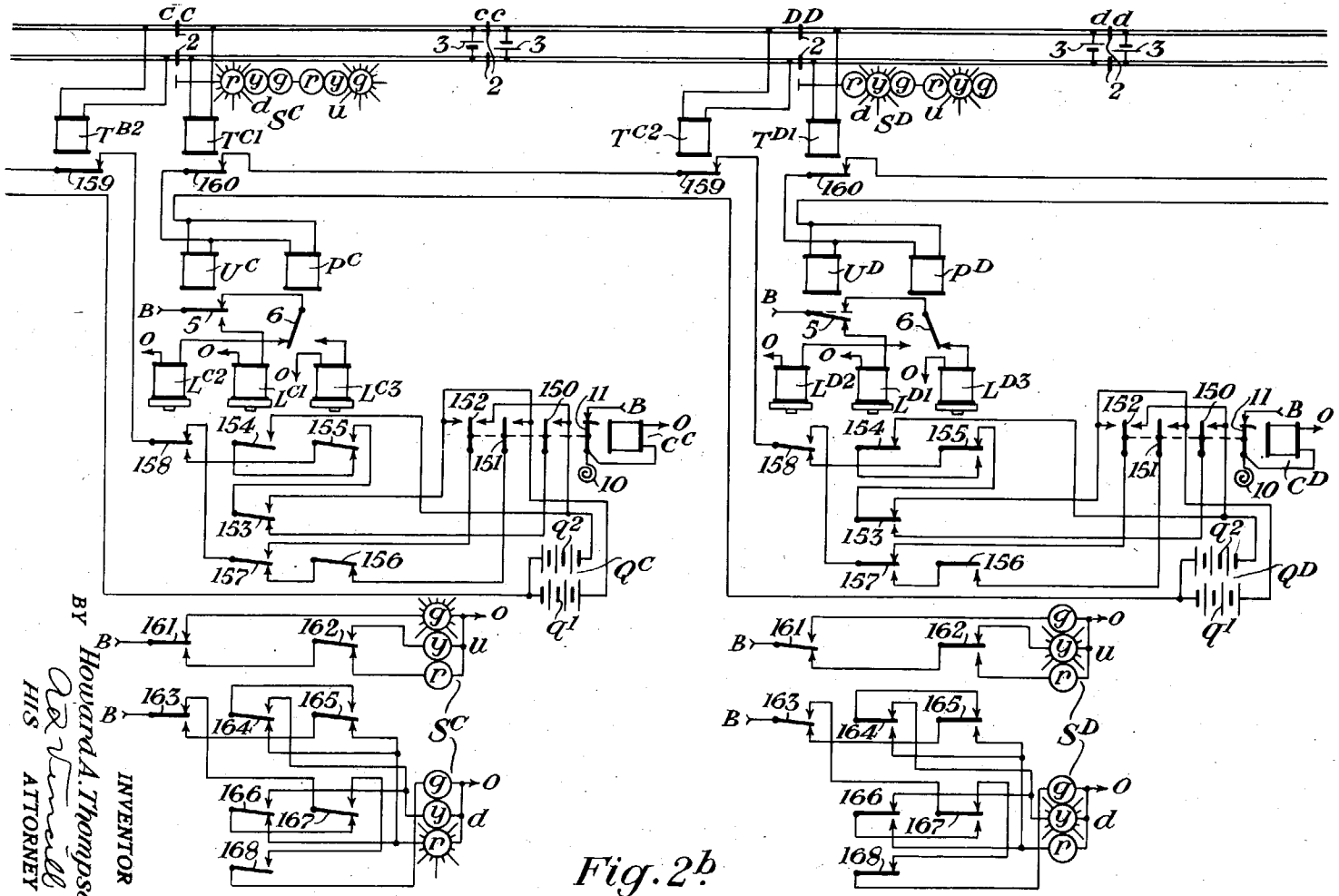
Figure 2C:
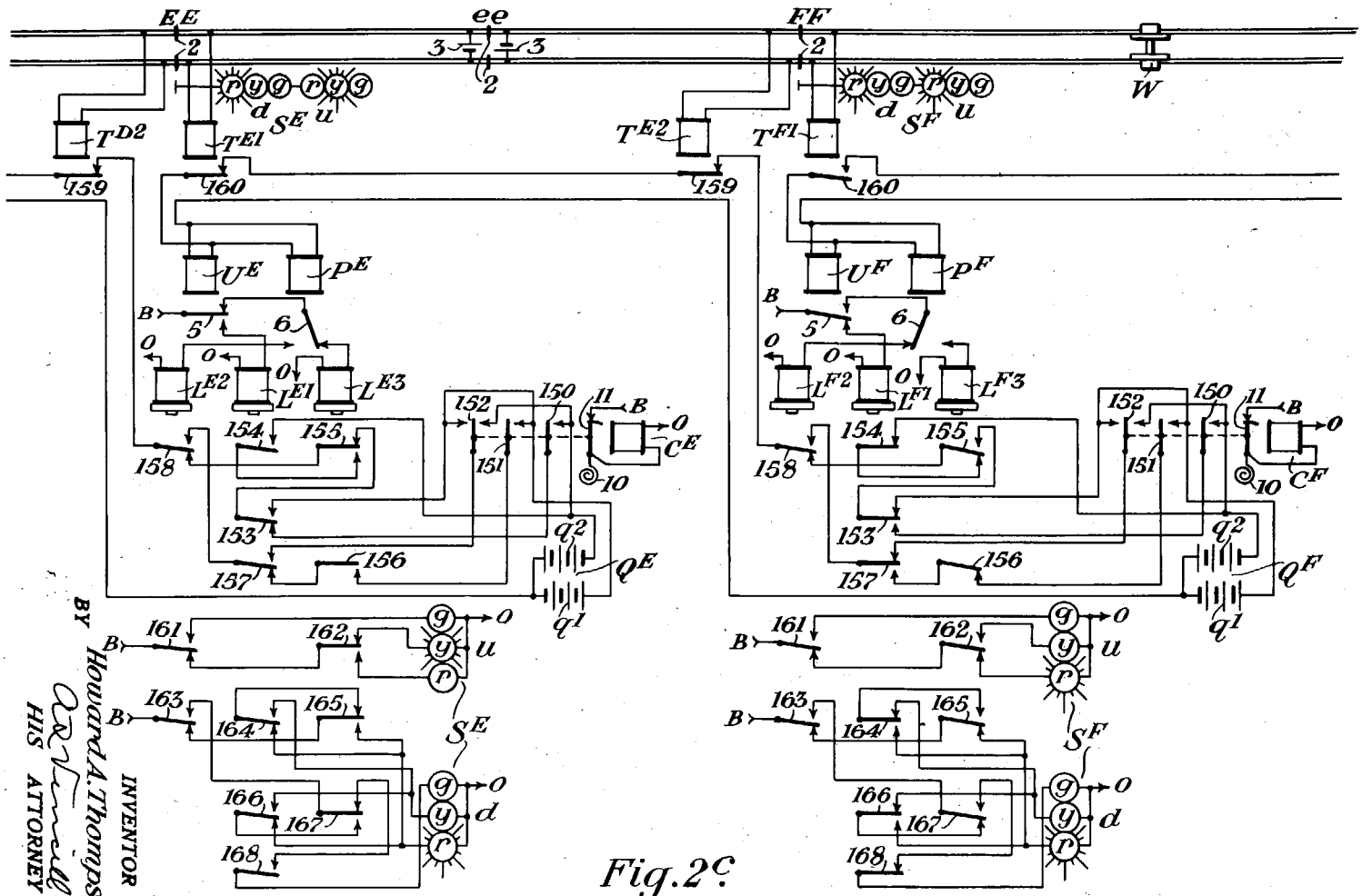
Figure 3A:
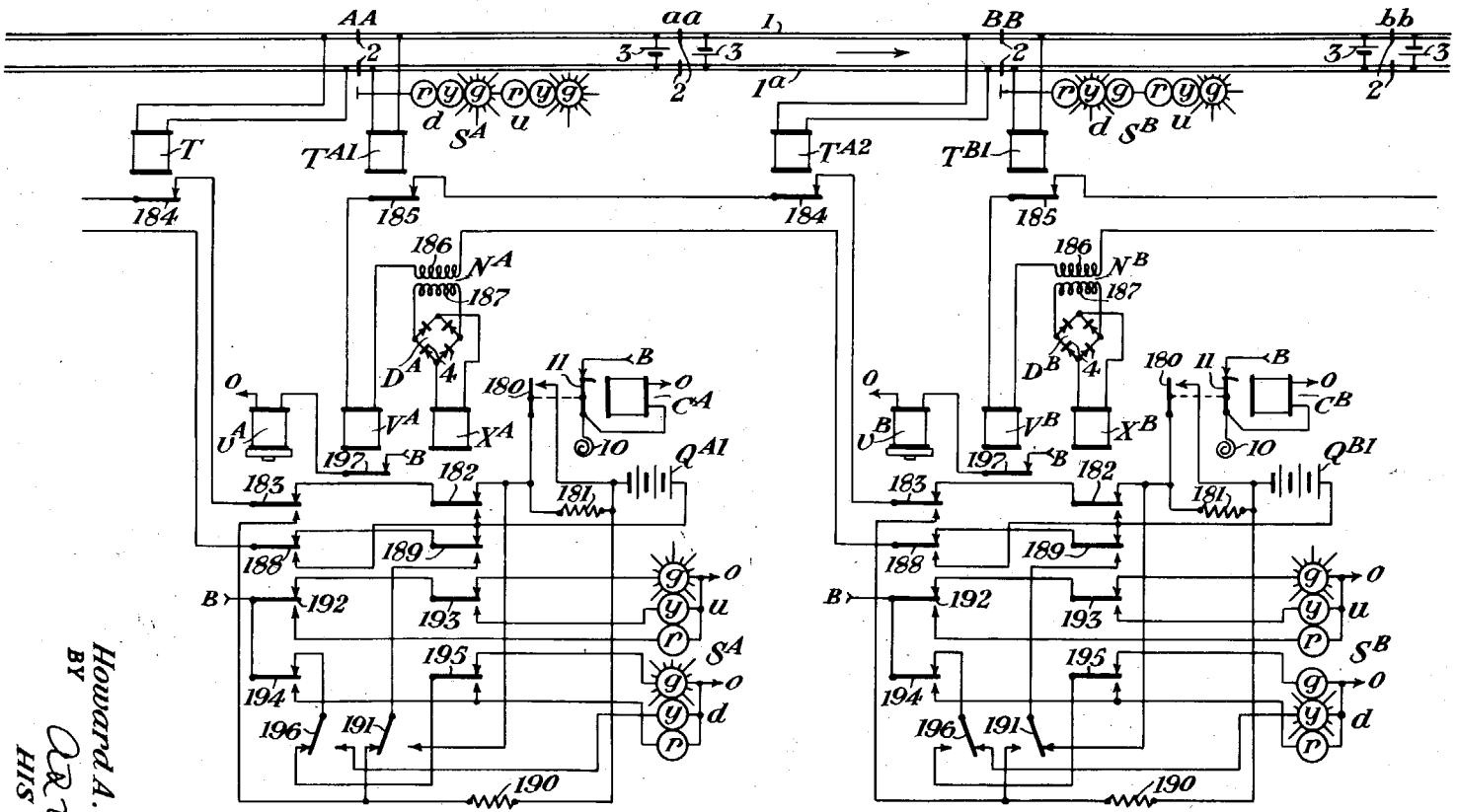
Figure 3B:
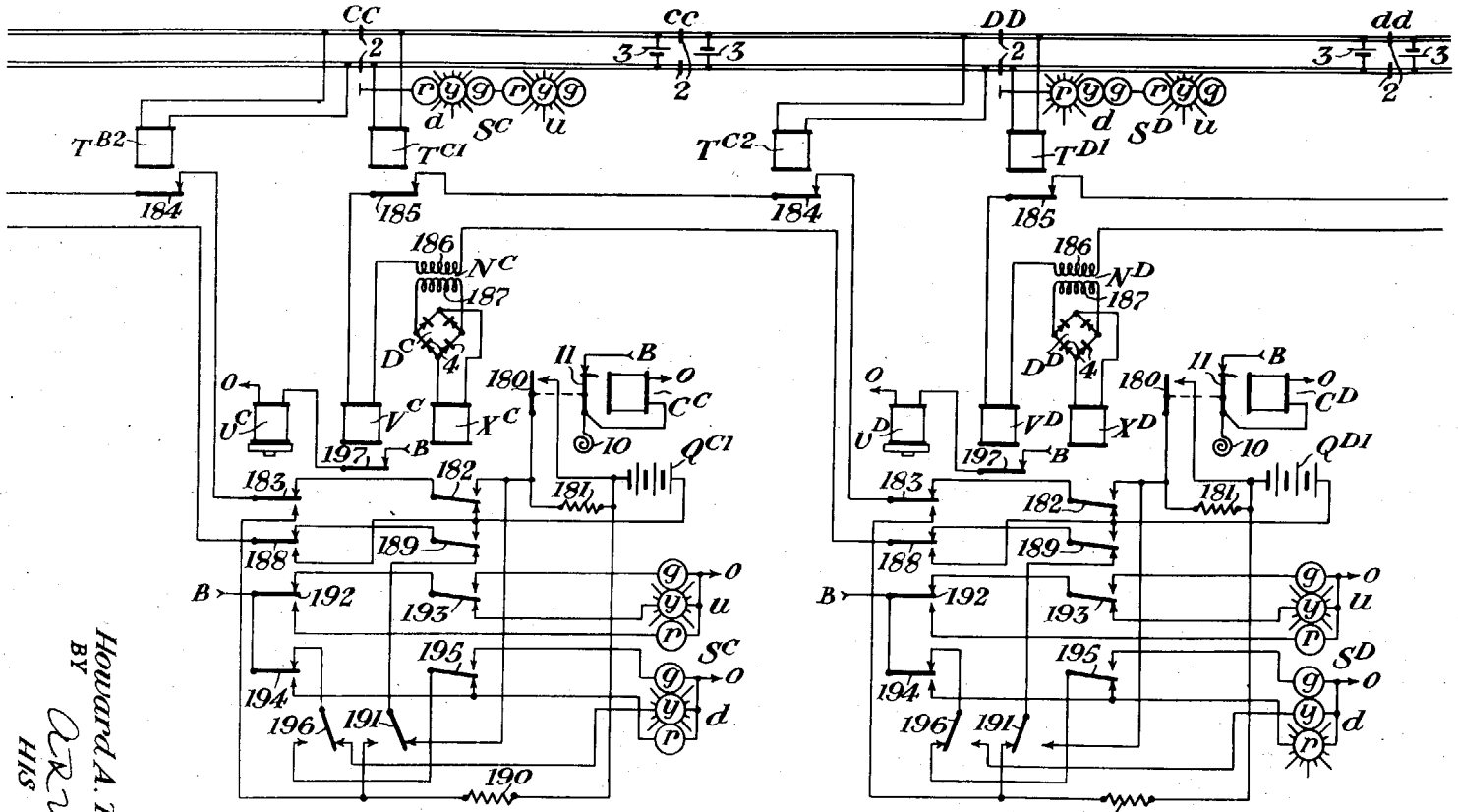
Figure 4:
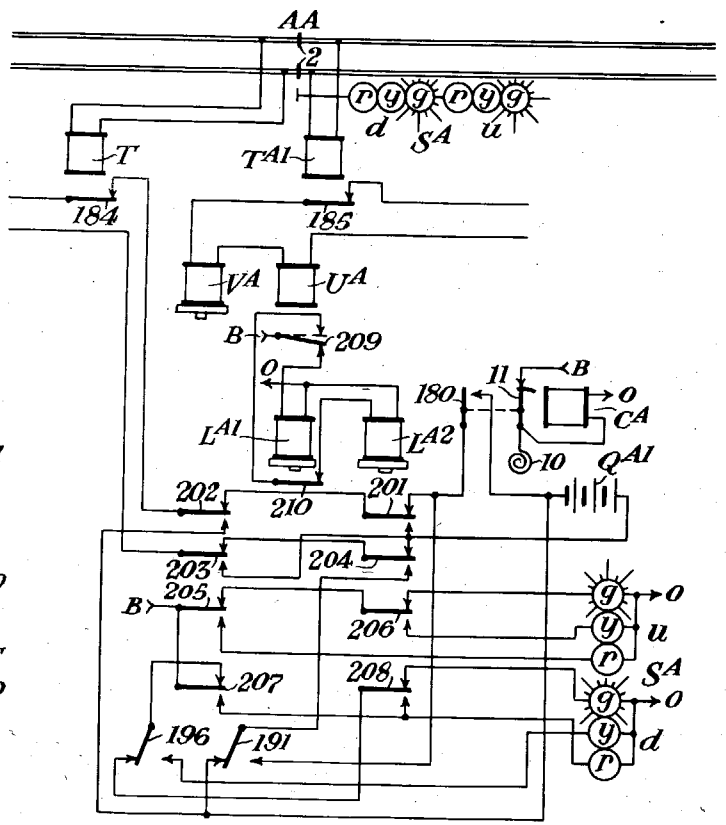
Figure 3C:
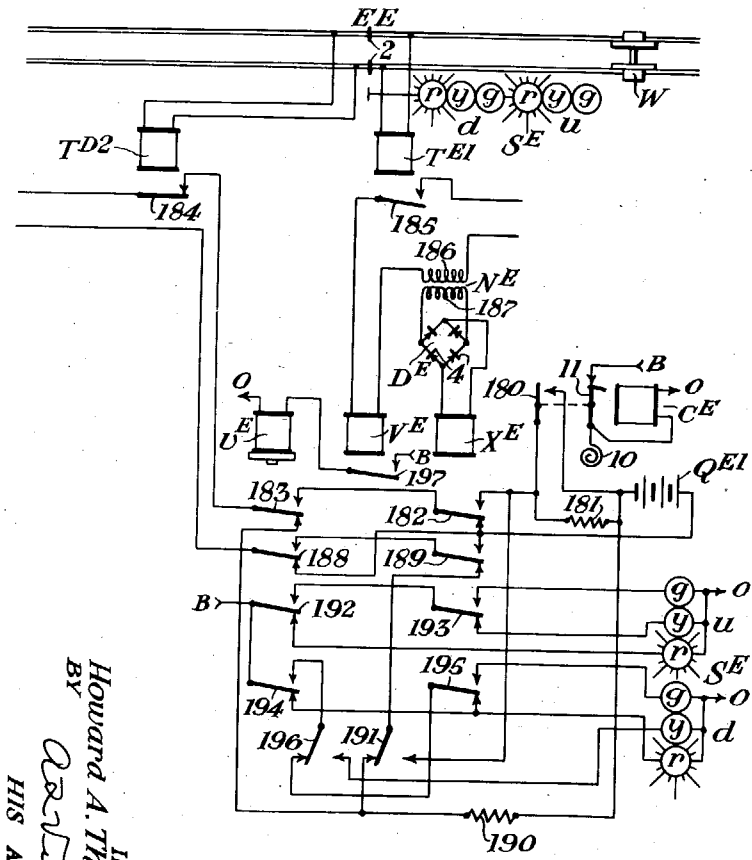
Figure 5:
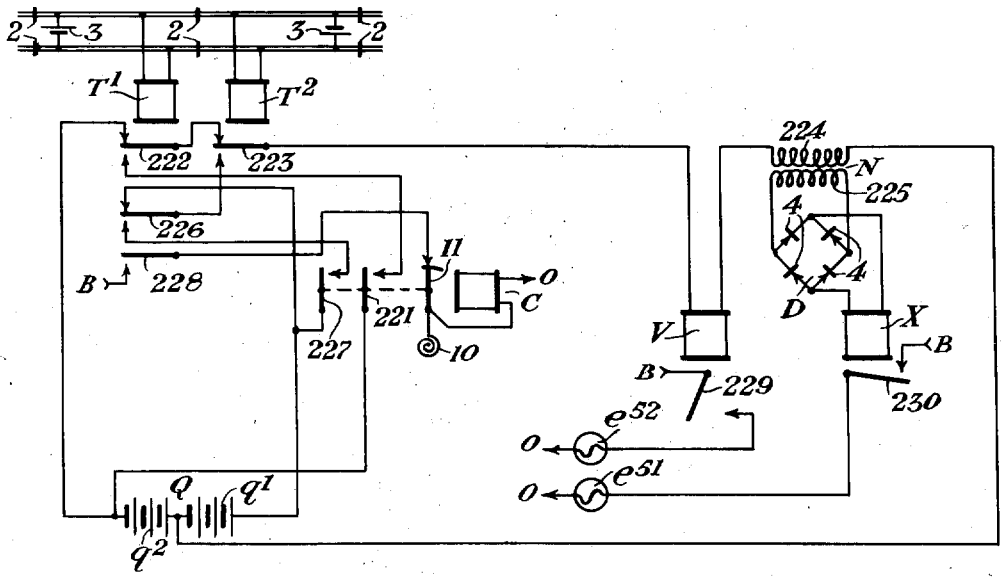

In the accompanying drawings, Figs. $1^a$ and $1^b$ when placed end to end with Fig. $1^a$ on the left, constitute a diagrammatic view showing one form of apparatus embodying my invention for the control and indication of switches and signals. Figs. $2^a$, $2^b$ and $2^c$, when placed end to end in the order named, with Fig. $2^a$ on the left, and Figs. $3^a$, $3^b$ and $3^c$, when placed end to end in the order named, with Fig. $3^a$ on the left, constitute diagrammatic views showing two forms of apparatus for the control of five-block and four-block automatic signals, respectively, and also embodying my invention. Figs. 4 and 5 are views showing modifications of the apparatus shown in Figs. $3^a$, $3^b$ and $3^c$, and also embodying my invention.

Similar reference characters refer to similar parts in each of the several views.

Referring first to Figs. $1^a$ and $1^b$, a railway track switch, designated by the reference character F, is shown connecting a main track Y with a siding Z. Signals, each of which is designated by the reference character S with a distinguishing exponent, govern traffic movements in opposite directions over switch F. Other traffic governing devices shown as electric lamps and designated by the reference character E with distinguishing exponents, are also shown adjacent switch F.

Main track Y and siding Z are divided by insulated joints 2 to form a track section *ff—hh* adjacent switch F. This section is provided with a track circuit including a battery 3 connected across the rails adjacent one end of the section and a relay T connected across the rails adjacent the opposite end of the section.

Switch F operates a contact piece 72 which occupies the position in which it is shown in the drawings when switch F is in its normal position, and which occupies a position designated by the reference character $\mathbf{72}^a$ when switch F is moved to the reverse position. A pole-changer designated by the reference number 128 is also operated in conjunction with switch F.

Each of the signals S is controlled by a stick relay designated by the reference character H with an exponent corresponding to that of the signal which it controls. Stick circuits for relays $H^5$, $H^7$, $H^9$ and $H^{10}$ for controlling signals S are controlled by switch contact piece 72 and by track relay T as well as by a relay designated by the reference character $J^6$.

Switch F is controlled by two stick relays designated by the reference characters $A^{2n}$ and $A^{15r}$, respectively. Relay $A^{2n}$ governs operations of switch F to its normal position, and relay $A^{15r}$ governs operations of switch F to its reverse position.

Lamps E, relay $J^6$, and the pick-up circuits for relays A and H are selectively controlled by slow releasing relays designated by the reference characters $L^1$, $L^2$ and $L^3$, respectively, and by relays designated by the reference characters $R^1$ and $R^2$, respectively.

Relay $L^1$ receives energy from the secondary winding 29 of a transformer $N^1$ through a rectifier $D^6$ which may be of a type which comprises four copper oxide asymmetric units each of which is designated by the reference numeral 4. Relays $L^2$ and $L^3$ are controlled by a neutral code following relay $U^1$ and by a polarized code following relay $P^1$. Relay $P^1$ is so constructed that, during periods when it is deenergized, it will retain its polar contacts closed in the position to which they were last previously operated. Relays $R^1$ and $R^2$ receive energy from rectifiers $D^1$ and $D^2$, respectively, which may be of the same type as rectifier $D^6$. Rectifiers $D^1$ and $D^2$ are selectively energized by current from a second transformer $N^2$ flowing through tuned circuits which, as here indicated, comprise condensers designated by the reference characters $a^1$ and $a^2$, respectively, and reactors designated by the reference characters $b^1$ and $b^2$, respectively, which are so proportioned that the circuit for rectifier $D^1$ is responsive only to alternating current having a frequency of 80 cycles per minute to operate relay $R^1$, and the circuit for rectifier $D^2$ is responsive only to alternating current having a frequency of 120 cycles per minute to operate relay $R^2$.

Transformer $N^2$ is provided with a tap at the mid point of its primary winding 7, which is connected to negative terminal O of a source of current not shown in the drawings. The ends of primary winding 7 of transformer $N^2$ are at times alternately connected to positive terminal B of the same source of current through front and back points of a contact 5 of relay $U^1$. In this way, current is alternately supplied in opposite directions to the two halves of primary winding 7 of transformer $N^2$, causing alternating current to be generated in the secondary winding 8 of transformer $N^2$ of a frequency corresponding to the frequency of closing the front point of contact 5 of relay $U^1$.

Relays $U^1$ and $P^1$ are connected across line wires 12 and 15 in multiple with each other and in multiple with a condenser $a^6$ but in series with the primary winding 13 of transformer $N^1$ and with a back contact 14 of a slow releasing relay I. Current for energizing relays $U^1$ and $P^1$ and primary winding 13 of transformer $N^1$ is carried by conductors 12 and 15 from a control point which may be a dispatcher's office or an interlocking tower.

At the control point, a master circuit controller M which, as here shown, is of the push button type biased to a normal position, but which may be of any other suitable type, is equipped with a front contact 24 which is closed only when the circuit controller is in its normal position, and with a back contact 25 which is closed only when the circuit controller is operated to a depressed position.

Current is supplied to a line control relay K through back contact 25 of circuit controller M. A resistance unit 26 is included in the pick-up circuit for relay K in order to make this relay slow in picking up.

When front contact 16 of relay K has become closed, control currents of various characteristics can be supplied over conductors 12 and 15 as selected by independent auxiliary manually operable circuit controller contacts which are designated by the reference character $m$ with distinguishing exponents, and which, as here shown, are of the push button type, but which may be of any other suitable type such, for example, as lever operated contacts.

The control currents thus supplied to conductors 12 and 15 through contacts $m^1$ to $m^8$, inclusive, are generated by one or the other or both of the groups $q^1$ and $q^2$ of cells of a battery $Q^1$. When any one of the contacts $m^9$ to $m^{16}$, inclusive, is closed while contact 16 of relay K is closed, conductors 12 and 15 are supplied with alternating current from secondary winding 17 of a transformer $N^4$ as well as with current from battery $Q^1$.

The character of the control currents supplied by battery $Q^1$ and by transformer $N^4$ may be modified by coding devices in the dispatcher's office designated by the reference characters $C^1$, $C^2$, $C^3$ and $C^4$. Each of these coding devices may be of an oscillatory type operating at a low frequency of the order of 40, 60, 80 or 120 cycles per minute, and provided with a self-control contact 11 as well as with other contacts for modifying the currents supplied to line wires 12 and 15, and also having a winding designated by the numeral corresponding to the frequency at which the coder operates. The contacts of each coder C are biased by a coil spring 10 to the position shown in the drawings, when the coder is deenergized.

When either contact $m^8$ or $m^9$ is closed, continuous control current of what I will term "positive polarity" is supplied to conductors 12 and 15 by battery $Q^1$. When either contact $m^5$ or $m^{12}$ is closed, continuous control current of negative polarity is supplied to conductors 12 and 15 by battery $Q^1$. When contact $m^7$ or contact $m^{10}$ is closed, unidirectional current of positive polarity, periodically interrupted by coder $C^3$ at a frequency of eighty times per minute, is supplied to conductors 12 and 15 by battery $Q^1$. When contact $m^6$ or contact $m^{11}$ is closed, unidirectional current of positive polarity, periodically interrupted by coder $C^4$ at a frequency of 120 times per minute, is supplied to conductors 12 and 15 by battery $Q^1$. When contact $m^4$ or contact $m^{13}$ is closed, unidirectional current of negative polarity, periodically interrupted at a frequency of eighty times per minute, is supplied to conductors 12 and 15. When either contact $m^3$ or $m^{14}$ is closed, undirectional current of negative polarity, periodically interrupted at a frequency of 120 times per minute, is supplied to conductors 12 and 15. When either contact $m^2$ or $m^{15}$ is closed, positive current, periodically interrupted at a frequency of forty times per minute, is supplied to conductors 12 and 15 alternately with negative current periodically interrupted at a frequency of forty times per minute. When contact $m^1$ or contact $m^{16}$ is closed, current of positive polarity, periodically interrupted at a frequency of sixty times per minute, is supplied to conductors 12 and 15 alternately with current of negative polarity interrupted at a frequency of sixty times per minute.

The character of the current supplied to conductors 12 and 15 by battery $Q^1$ through each contact $m$ is designated on the drawings directly to the right of the showing of each contact $m$. For example, continuous current of positive polarity supplied through contacts $m^8$ and $m^9$ is designated by the plus sign; continuous current of negative polarity supplied through contacts $m^5$ and $m^{12}$ is designated by the minus sign; current of positive polarity periodically interrupted at a frequency of eighty times per minute, supplied through contacts $m^7$ and $m^{10}$, is designated +80; and current of positive polarity interrupted forty times per minute and alternated with current of negative polarity interrupted forty times per minute, supplied through contacts $m^2$ and $m^{15}$, is designated ±40.

Whenever current is supplied to conductors 12 and 15 from battery $Q^1$ by the closure of any one of the contacts $m$, both relays $U^1$ and $P^1$ will be energized, and hence one or the other or both of the relays $L^2$ and $L^3$ will be energized accordingly as current of positive, or of negative polarity, or of positive polarity periodically alternated with current of negative polarity is supplied to conductors 12 and 15 by battery $Q^1$.

Whenever transformer $N^4$ supplies alternating current to conductors 12 and 15, such current will energize transformer $N^1$ which will, in turn, energize relay $L^1$.

At the control point, the condition of track relay T, switch F and signals S is shown by a plurality of indicators, here shown as electric lamps, each of which is designated by the reference character $e$ with an exponent which is indicative of the traffic governing device with which it is associated. Indicators $e$ are selectively controlled by relays $L^4$, $L^5$, $L^6$, $R^3$ and $R^4$ similarly to the manner in which relays A, H and J and lamps E are controlled by relays $L^1$, $L^2$, $L^3$, $R^1$ and $R^2$ as previously described. As shown in the drawings, relays $L^4$, $L^5$, $L^6$, $R^3$ and $R^4$ are controlled only by track relay T, switch F, and signals S for in turn controlling associated indicators designated by the reference character $e$ with distinguishing exponents. Relays $L^4$, $L^5$, $L^6$, $R^3$ and $R^4$ could also be controlled by other traffic governing devices, not shown, for in turn controlling other indicators and circuits which are shown in dash lines, and without reference characters, adjacent indicators $e$.

Relay $L^4$ receives energy from transformer $N^5$ through rectifier $D^5$ similarly to the manner in which relay $L^1$ receives energy from transformer $N^1$ through rectifier $D^6$. Relay $R^3$ and $R^4$ receive energy from transformer $N^6$ through rectifiers $D^3$ and $D^4$ similarly to the manner in which relays $R^1$ and $R^2$ receive energy from transformer $N^2$ through rectifier $D^1$ and $D^2$. Relays $L^5$ and $L^6$ are controlled by code following relays $U^2$ and $P^2$ similarly to the manner in which relays $L^2$ and $L^3$ are controlled by code following relays $U^1$ and $P^1$. Relay $P^2$ is constructed similarly to relay $P^1$ for retaining its polar contacts closed when its windings are deenergized.

Code following relays $U^2$ and $P^2$ are connected across line conductors 12 and 15 in multiple with each other and with a condenser $a^5$ but in series with primary winding 13 of transformer $N^5$ and also in series with back contact 28 of relay K and with front contact 24 of master controller M. Similarly to the manner in which relays $U^1$ and $P^1$ and primary winding 13 of transformer $N^1$ are selectively controlled by currents from battery $Q^1$ and transformer $N^4$, relays $U^2$ and $P^2$ and primary winding 13 of transformer $N^5$ are selectively controlled by currents supplied to conductors 12 and 15 from a battery $Q^2$ and from a transformer $N^3$ adjacent switch F.

The various currents supplied to conductors 12 and 15 by battery $Q^2$ are selectively controlled by contacts operated by signals S and by contact 94 of relay T and contact 95 of a switch indication relay $f$. Relay $f$ is controlled by pole-changer 128, which is operated in conjunction with switch F, so that contact 95 is closed in its normal position, in which it is shown in the drawings, when switch F is in its normal position, and so that contact 95 is closed in its reverse position when switch F is in its reverse position.

The current supplied to conductors 12 and 15 by battery $Q^2$, selectively controlled by signals $S^7$ and $S^5$ in their proceed positions is periodically interrupted by coders $C^7$ and $C^8$, respectively, which operate at low frequencies of the order of 80 and 120 cycles per minute, similarly to coders $C^3$ and $C^4$, and the current supplied by battery $Q^2$, selectively controlled by signals $S^9$ and $S^{10}$ in their proceed positions, is periodically alternated by coders $C^5$ and $C^6$ which operate at half the frequencies of coders $C^7$ and $C^8$, respectively, that is, forty and sixty cycles per minute. When both signals $S^7$ and $S^9$ are in their stop positions while switch F is in its reverse position, battery $Q^2$ will supply constant unidirectional current of negative polarity to conductors 12 and 15. When signals $S^5$ and $S^{10}$ are in their stop positions while switch F is in its normal position, battery $Q^2$ will supply constant unidirectional current of positive polarity to conductors 12 and 15. In addition to the current supplied to conductors 12 and 15 by battery $Q^2$, alternating current will be supplied to these conductors by transformer $N^3$ whenever switch F is in its reverse position while track relay T is energized. When track relay T becomes deenergized, battery $Q^2$ will supply conductors 12 and 15 with unidirectional current of negative polarity periodically interrupted at a frequency of 80 times per minute by coder $C^7$.

When the dispatcher closes any one of the push button contacts $m$ and contact 25 of master controller M, causing one of the relays $L^2$ and $L^3$ to become energized, a slow releasing relay G will become energized by a circuit which includes a front contact of one or the other of the relays $L^2$ and $L^3$.

When the dispatcher releases master controller M after having depressed it to supply current to conductors 12 and 15, relay K will become deenergized because its pick-up and stick circuits will then be opened at contact 25 of controller M. With relay K deenergized and with controller M in its normal position, the indication apparatus in the dispatcher's office will be in condition to be controlled by track relay T, switch F and signals S. An indication current will then be supplied to conductors 12 and 15, and such current will flow to these conductors through the winding of a slow release indication stick relay I in series with two of the units 4 of a rectifier $D^7$ and with contact 78 of relay G and contacts 79 and 81 of relays $L^3$ and $L^2$, respectively. Relay I, upon becoming energized, will disconnect, at its back contact 14, relays $U^1$ and $P^1$ and transformer $N^1$ from conductors 12 and 15, thus preventing indication current from causing any of the control relays $L^1$, $L^2$, $L^3$, $R^1$ and $R^2$ to become energized.

Having described, in general, the arrangement and operation of the form of apparatus shown in Figs. $1^a$ and $1^b$, I will now trace in detail a few examples of the operation of this form of apparatus.

As shown in the drawings, each of the auxiliary push button circuit controller contacts $m$ is in its normally open position; master push button controller M is in its normal position; each of the signals S is in its stop position; switch F is in its normal position; each of the traffic governing devices E is deenergized; track relay T is energized; each of the control relays K, $U^1$, $P^1$, $L^1$, $L^2$, $L^3$, $R^1$, $R^2$, $A^{15r}$, H and J is deenergized; switch control relay $A^{2n}$ is energized by its stick circuit; each of the indicators $e$ is deenergized except indicator $e^{Fn}$ which is energized; each of the indicator control relays I, $U^2$, $P^2$ and $L^5$ is energized; and each of the indicator control relays G, $L^4$, $L^6$, $R^3$ and $R^4$ is deenergized.

The stick circuit by which relay $A^{2n}$ is energized passes from terminal B, through contact 66 of relay $A^{15r}$, contact 67 of relay $A^{2n}$, and the winding of relay $A^{2n}$ to terminal O.

The circuit by which relays I and $U^2$ and $P^2$ are energized is a stick circuit for relay I, passing from portion $q^1$ of battery $Q^2$, through conductor 12, windings of relays $U^2$ and $P^2$ in multiple, winding 13 of transformer $N^5$, contact 28 of relay K, contact 24 of circuit controller M, conductor 15, upper left-hand unit 4 of rectifier $D^7$, winding of relay I, contact 82 of relay I, lower right-hand unit 4 of rectifier $D^7$, wire 83, front point of contact 94 of relay T, contact 95 of relay $f$ in its left-hand position, contact 84 of signal $S^{10}$, and contact 86 of signal $S^5$, back to portion $q^1$ of battery $Q^2$. The current supplied to this circuit by battery $Q^2$ is of positive polarity, and therefore contact 6 of relay $P^2$ is closed in its left-hand position. The current supplied to this circuit is continuous, and so causes contact 5 of relay $U^2$ to be constantly closed at its front point.

Relay $L^5$ is therefore energized by a circuit passing from terminal B, through the front point of contact 5 of relay $U^2$, contact 6 of relay $P^2$ in its left-hand position, and the winding of relay $L^5$ to terminal O.

With relay $L^5$ energized, indicator $e^{Fn}$ is lighted by its circuit passing from terminal B, through the back point of contact 106 of relay $L^4$, back point of contact 107 of relay $R^3$, back point of contact 108 of relay $R^4$, front point of contact 109 of relay $L^5$, and indicator $e^{Fn}$ to terminal O.

Primary winding 9 of control transformer $N^4$, and primary winding 9 of indication transformer $N^3$ are constantly connected with terminals BX and CX of a suitable source of current not shown in the drawings, and are therefore normally energized. Each of the control coders $C^1$, $C^2$, $C^3$ and $C^4$, and also each of the indication coders $C^5$, $C^6$, $C^7$ and $C^8$ is connected through its own contact 11 with terminals B and O of a second source of current not shown in the drawings, and is, therefore, constantly in operation.

I will assume that the dispatcher desires to permit a train to move along track Y from left to right as shown in the drawings, which I will assume to be the eastbound direction, over switch F in its normal position. He will, therefore, close contact $m^{10}$ and depress master controller M. This operation of controller M will open its contact 24, thereby breaking the circuit previously traced for relays I, $U^2$ and $P^2$. With relay $U^2$ deenergized, the circuit traced for relay $L^5$ will be open at the front point of contact 5 of relay $U^2$, causing relay $L^5$ to be deenergized. The circuit previously traced for indicator $e^{Fn}$ will therefore be broken at the front point of contact 109 of relay $L^5$, causing this indicator to be deenergized. Relay I, having a slow release, will not at once close its back contact 14, but will do so after the lapse of a brief period of time.

The closing of contact 25 of master controller M will cause slow pick-up relay K to become energized by its pick-up circuit passing from terminal B, through contact 25 of controller M, resistor 26, and the winding of relay K to terminal O. Relay K, upon closing its contact 27, will complete its own stick circuit passing from terminal B, through contact 25 of controller M, contact 27 of relay K, and the winding of relay K to terminal O.

Relay K, upon becoming energized, will also complete, at its contact 16, a circuit passing from the positive terminal of the portion $q^1$ of battery $Q^1$, through conductors 12 and 12a, windings of relays $U^1$ and $P^1$ in multiple with each other and with condenser $a^6$, primary winding 13 of transformer $N^1$, contact 14 of relay I, conductors 15 and 15a, contact 16 of relay K, secondary winding 17 of transformer $N^4$, contact $m^{10}$, and contact 18 of coder $C^3$, back to battery $Q^1$.

Alternating current is supplied to this circuit by transformer $N^4$ and current of positive polarity periodically interrupted at a frequency of eighty times per minute is supplied to the same circuit by battery $Q^1$. The alternating current will flow through condenser $a^6$ to energize primary winding 13 of transformer $N^1$, and the current from battery $Q^1$ will flow through the windings of relays $U^1$ and $P^1$.

Secondary winding 29 of transformer $N^1$ will, therefore, supply alternating current to rectifier $D^6$ which will, in turn, supply direct current for operating relay $L^1$. The current of positive polarity from battery $Q^1$, periodically interrupted eighty times per minute, will cause relay $P^1$ to hold its contact 6 closed in the left-hand position and will cause relay $U^1$ to close contact 5 alternately at its front and back points eighty times per minute.

During the periods when contact 5 of relay $U^1$ is closed at its front point, a circuit will be completed for energizing relay $L^2$, passing from terminal B, through contact 5 closed at its front point, contact 6 of relay $P^1$ in its left-hand position, and the winding of relay $L^2$ to terminal O.

Relay $L^2$, upon becoming energized, completes, at its contact 76, a circuit for energizing relay G, passing from terminal B, through contact 76, contact 77 of relay I, and the winding of relay G to terminal O.

Each time that contact 5 becomes closed at its front point, a circuit is also completed for energizing the right-half of primary winding 7 of transformer $N^2$, passing from terminal B, through the front point of contact 5, and right-half of winding 7 to terminal O. Each time that contact 5 is closed at its back point, a circuit is completed for energizing the left-half of primary winding 7 in the opposite direction, passing from terminal B, through the back point of contact 5, and the left-half of winding 7 to terminal O. Alternating current is therefore generated in secondary winding 8 of transformer $N^2$ of a frequency to which the circuit for rectifier $D^1$ is tuned, and hence rectifier $D^1$ will supply direct current for operating relay $R^1$.

Relays $L^1$ and $L^2$, being slow releasing, will retain their front contacts in the closed position in the intervals during which they are deenergized by the opening of contact 18 of coder $C^3$.

With relays $L^1$, $R^1$ and $L^2$ energized, a circuit will be completed for energizing relay $H^{10}$, passing from terminal B, through the front point of contact 30 of relay $L^1$, front point of contact 42 of relay $R^1$, front point of contact 46 of relay $L^2$, back point of contact 47 of relay $L^3$, winding of relay $H^{10}$, contact 72 of switch F in its normal position, and contact 96 of relay T to terminal O. Relay $H^{10}$, upon closing its front contacts, completes its own stick circuit passing from terminal B, through contact 52 of relay $J^6$, contact 56 of relay $H^{10}$, winding of relay $H^{10}$, contact 72 of switch F, and contact 96 of relay T to terminal O.

At the same time, relay $H^{10}$, completes a circuit for signal $S^{10}$, passing from terminal B, through contact 57 of relay $H^{10}$, and the mechanism of signal $S^{10}$ to terminal O. The arm of signal $S^{10}$ thereupon moves to its proceed position, closing its contact 84 in the corresponding position.

When the dispatcher now releases master controller M, relay K will become deenergized on account of the opening of contact 25 of controller M. Contact 16 of relay K will therefore open the line control circuit previously traced for signal $S^{10}$, causing relays $L^1$, $R^1$ and $L^2$ to become deenergized. The arm of signal $S^{10}$ will, however, be retained in its proceed position on account of relay $H^{10}$ being energized by its stick circuit.

Relay G, being slow releasing, retains its contact 78 in the closed position for a brief period after its circuit becomes opened at contact 76 of relay $L^2$. Therefore, when back contact 28 of relay K closes, an indication circuit will be completed, passing from the positive terminal of the portion $q^2$ of battery $Q^2$, through the back point of contact 105 of coder $C^6$, contact 84 of signal $S^{10}$, contact 95 of relay $f$ in its left-hand position, front point of contact 94 of relay T, wire 83, upper right-hand unit 4 of rectifier $D^7$, winding of relay I, contact 78 of slow release relay G, contact 79 of relay $L^3$, contact 81 of relay $L^2$, lower left-hand unit 4 of rectifier $D^7$, wire 15, contact 24 of controller M, contact 28 of relay K, primary winding 13 of transformer $N^5$, the windings of relays $U^2$ and $P^2$ in multiple with each other and with condenser $a^5$, and conductor 12 back to the portion $q^2$ of battery $Q^2$. Relay I, upon becoming thus energized, completes, at its contact 82, its own stick circuit which is the same as the pick-up circuit just traced except that contact 82 completes a branch path around the part of the pick-up circuit which includes contact 78 of relay G, contact 79 of relay $L^3$, and contact 81 of relay $L^2$. Coder $C^6$ is constantly operating, and hence its contact 105 is alternately closing at its front and back points. When contact 105 of coder $C^6$ closes at its front point, the circuit just traced will be provided with a branch path which includes the front point of contact 105 and the portion $q^1$ of battery $Q^2$ instead of the back point of contact 105 and the portion $q^2$ of battery $Q^2$.

Primary winding 13 of transformer $N^5$, and the windings of relays $U^2$ and $P^2$ are therefore periodically energized by current of negative polarity from the portion $q^2$ of battery $Q^2$, alternately with current of positive polarity from the portion $q^1$ of battery $Q^2$. The current generated in secondary winding 29 of transformer $N^5$ as a result of this periodically alternated current will, however, not be sufficient to operate relay $L^4$.

Relay $U^2$ will close its contact 5 at the front point each time current of positive polarity is supplied to conductors 12 and 15 by portion $q^1$ of battery $Q^2$, and also each time current of negative polarity is supplied to conductors 12 and 15 by the portion $q^2$ of battery $Q^2$. Contact 5 will close at its back point each time contact 105 of coder $C^6$ opens at either its front or its back point. Contact 6 of relay $P^2$ will close in its left-hand position each time current of positive polarity is supplied to conductors 12 and 15 by portion $q^1$ of battery $Q^2$, and will close in its right-hand position each time current of negative polarity is supplied to conductors 12 and 15 by portion $q^2$ of battery $Q^2$.

Since contact 5 of relay $U^2$ closes at its front point for each positive and negative pulse, it will thus close 120 times per minute, and hence relay $R^4$, the circuit for rectifier $D^4$ being tuned to 120 cycles per minute, will become energized.

Each time the current of positive polarity is supplied to relays $U^2$ and $P^2$, relay $L^5$ will become energized by its circuit previously traced. Since relay $L^5$ is slow releasing, it will retain its contacts closed at the front points during the periods between the periodic closings of its circuit just traced.

Each time relays $U^2$ and $P^2$ become energized by current of negative polarity, relay $L^6$ will be energized by a circuit passing from terminal B, through the front point of contact 5 of relay $U^2$, contact 6 of relay $P^2$ in its right-hand position, and the winding of relay $L^6$ to terminal O. Relay $L^6$, being also slow releasing, will retain its contacts closed at their front points during the intervals between the successive closings of its circuit just traced.

With relay $R^4$ energized, and with relays $L^5$ and $L^6$ retaining their contacts closed at the front points on account of being periodically energized by their circuits just traced through contact 6 of relay $P^2$ in its left-hand and right-hand positions, a circuit will be completed for energizing indicator $e^{S10}$, passing from terminal B, through the back point of contact 106 of relay $L^4$, back point of contact 107 of relay $R^3$, front point of contact 108 of relay $R^4$, front point of contact 114 of relay $L^5$, front point of contact 115 of relay $L^6$, and indicator $e^{S10}$ to terminal O. Lamp $e^{S10}$ will therefore be lighted, and hence the dispatcher will know that signal $S^{10}$ is indicating "proceed."

I will assume that while signal $S^{10}$ is indicating "proceed" and indicator $e^{S10}$ is lighted to show the dispatcher that signal $S^{10}$ is indicating "proceed", an east-bound train passes signal $S^{10}$, causing track relay T to become deenergized. Relay T, upon becoming deenergized, opens its contact 96, thereby breaking the stick circuit previously traced for relay $H^{10}$. Relay $H^{10}$, upon becoming deenergized, opens its contact 57, thereby breaking the mechanism circuit for signal $S^{10}$ and thus causing signal $S^{10}$ to indicate "stop". The deenergization of relay T also causes its contact 94 to open at the front point, thereby breaking the control circuit previously traced for indication relays I, $U^2$ and $P^2$, and so causing indicator lamp $e^{S10}$ to be extinguished.

Upon the closing of contact 94 of relay T at its back point, a third circuit will be completed for indication relays I, $U^2$ and $P^2$, passing from the portion $q^2$ of battery $Q^2$, through contact 102 of coder $C^7$, back point of contact 94 of relay T, wire 83, and thence by the path previously traced for the stick circuit for relay I, through the windings of relays I, $U^2$ and $P^2$ back to battery $Q^2$. It will be noted that the windings of relays I, $U^2$ and $P^2$ are deenergized for only the brief period between the opening of contacts 94 of relay T at its front point and the closing of this contact at its back point, and hence relay I does not have time to release its front contacts. The transfer will therefore be made directly from the stick circuit for relay I for indicating the clearing of signal $S^{10}$ to the stick circuit for relay I for indicating the occupancy of track relay T, without it being necessary to energize relay I by a pickup circuit.

By means of this circuit, relays $U^2$ and $P^2$ are energized by current of negative polarity periodically interrupted at a frequency of 80 times per minute. Relay $U^2$ will, therefore, close its contact 5 at its front and back points, alternately, 80 times per minute, and relay $P^2$ will close its contact 6 in the right-hand position. With contact 5 of relay $U^2$ closing at its front and back points, alternately, 80 times per minute, transformer $N^6$ will supply current for which the circuit for rectifier $D^3$ is tuned, causing relay $R^3$ to become energized. The circuit previously traced for relay $L^6$ will be completed through the front point of contact 5 of relay $U^2$ and contact 6 of relay $P^2$ in its right-hand position, causing relay $L^6$ to be energized.

With relays $R^3$ and $L^6$ energized, a circuit will be completed for energizing indicator $e^T$, passing from terminal B, through the back point of contact 106 of relay $L^4$, front point of contact 107 of relay $R^3$, back point of contact 111 of relay $L^5$, contact 113 of relay $L^6$, and indicator $e^T$ to terminal O. With indicator $e^T$ lighted, the dispatcher will know that track section *ff—hh* is occupied.

When the train leaves section *ff—hh*, relay T again becomes energized, but signal $S^{10}$ will not clear without further action by the dispatcher. Relay T, upon becoming energized, opens its contact 94 at the back point and closes this contact at the front point, thereby transferring relay I from the stick circuit last described to the stick cuit first traced for this relay. This will cause lamp $e^T$ to be extinguished and lamp $e^{Fn}$ to again be lighted by its circuit previously traced.

I will now assume that the dispatcher desires to operate traffic governing device $E^8$. He will therefore close contact $m^8$, and will again depress master controller M. This operation of controller M will open, at its contact 24, the circuit traced for indication relays $U^2$ and $P^2$, and will close, at its contact 25, the pick-up circuit previously traced for relay K. Upon the lapse of a sufficient period of time after the opening of contact 24 of controller M and before relay K has had time to pick up, slow release relay I will open its front contact 82 and will close its back contacts 14 and 77. Contact 16 of relay K will then, upon becoming closed, complete a circuit for transformer $N^1$ and relays $U^1$ and $P^1$, passing from portion $q^1$ of battery $Q^1$, thence by the path previously traced for transformer $N^1$ and relays $U^1$ and $P^1$ as far as contact 16 of relay K, and thence through contact $m^8$ back to portion $q^1$ of battery $Q^1$.

Over this circuit, relays $U^1$ and $P^1$ will be energized by continuous current of positive polarity from the portion $q^1$ of battery $Q^1$. Transformer $N^1$ will not respond to such current to energize relay $L^1$, but relay $U^1$ will close its contact 5 at the front point and retain its contact in this position, and relay $P^1$ will close its contact 6 in the left-hand position and retain its contact 6 in this position.

Relay $L^2$ will therefore be constantly energized by its circuit previously traced, and hence a circuit will be completed for energizing traffic governing device $E^8$, passing from terminal B, through the back point of contact 30 of relay $L^1$, back point of contact 31 of relay $R^1$, back point of contact 32 of relay $R^2$, front point of contact 33 of relay $L^2$, and traffic governing device $E^8$ to terminal O.

I will next assume that the dispatcher desires to energize traffic governing device $E^{14}$. He will therefore close contact $m^{14}$ and depress controller M, causing a circuit to be completed for transformer $N^1$ and relays $U^1$ and $P^1$ which is similar to the circuits previously traced for transformer $N^1$ and relays $U^1$ and $P^1$ except that it is supplied with current by a path passing from portion $q^2$ of battery $Q^1$, through contact 21 of coder $C^4$, contact $m^{14}$, and secondary winding 17 of transformer $N^4$. Since this path includes contact 21 of coder $C^4$, the current supplied by battery $Q^1$ to relays $U^1$ and $P^1$ will be periodically interrupted at a frequency of 120 times per minute, and will be a negative polarity. The alternating current supplied to the circuit by transformer $N^4$ will cause relay $L^1$ to become energized. The direct current of negative polarity periodically interrupted 120 times per minute will cause transformer $N^2$ to generate current of a frequency to which the circuit for rectifier $D^2$ is tuned, and relay $R^2$ will therefore now be energized. Since the direct current is of negative polarity, relay $L^3$ will be energized on account of contact 6 of relay $P^1$ being closed in its right-hand position.

With relays $L^1$, $R^2$ and $L^3$ energized, a circuit will be completed for energizing device $E^{14}$, passing from terminal B, through the front point of contact 30 of relay $L^1$, back point of contact 42 of relay $R^1$, front point of contact 43 of relay $R^2$, back point of contact 49 of relay $L^2$, contact 51 of relay $L^3$, and device $E^{14}$ to terminal O.

I will now assume that the dispatcher desires to operate switch F to its reverse position. He will, therefore, close contact $m^{15}$ and will again depress circuit controller M. Upon the lapse of a brief period of time after the opening of contact 24 of controller M, relay I will permit its contact 82 to open and its contacts 14 and 77 to close.

On account of the closing of contact 25 of controller M, relay K will become energized by its circuit previously traced, and will, upon the lapse of a given period of time, again close its contact 16, thereby completing a circuit for energizing relays $U^1$ and $P^1$ and primary winding 13 of transformer $N^1$, passing from the portion $q^1$ of battery $Q^1$, thence by the path previously traced as far as contact 16 of relay K, secondary winding 17 of transformer $N^4$, contact $m^{15}$, and back point of contact 22 of coder $C^1$ back to battery $Q^1$. It will be noted that contact 22 of coder $C^1$ closes at its front point, alternately with its back point, 40 times per minute, and hence current is supplied to the circuit just traced by the portion $q^2$ of battery $Q^1$ through the front point of contact 22 of coder $C^1$, alternately with portion $q^1$ of battery $Q^1$ through the back point of contact 22 of coder $C^1$.

Alternating current supplied to the circuit by transformer $N^4$ will cause transformer $N^1$ to supply alternating current to rectifier $D^6$ for energizing relay $L^1$. Relay $U^1$ will be energized 40 times per minute by current passing from portion $q^1$ of battery $Q^1$, and 40 times per minute by current from the portion $q^2$ of battery $Q^1$, making a total of 80 times per minute that relay $U^1$ will close its contact 5 at the front point. Transformer $N^2$ will, therefore, supply current to which the circuit for rectifier $D^1$ is tuned, and hence relay $R^1$ will be energized. Relay $P^1$, on account of being energized alternately by current of normal and reverse polarities, will alternately close its contact 6 in the left-hand and the right-hand positions, causing relays $L^2$ and $L^3$ to be alternately energized through contact 6 in its left and right-hand positions, respectively. Relays $L^2$ and $L^3$, being slow in releasing, will retain their front contacts closed during the intervals between successive periods of energization.

With relays $L^1$, $R^1$, $L^2$ and $L^3$ holding their contacts closed at the front points, a circuit is completed for energizing relay $A^{15r}$, passing from terminal B, through the front point of contact 30 of relay $L^1$, front point of contact 42 of relay $R^1$, front point of contact 46 of relay $L^2$, front point of contact 47 of relay $L^3$, contact 64 of relay $H^5$, contact 65 of relay $H^{10}$, and the winding of relay $A^{15r}$ to terminal O. Relay $A^{15r}$, upon becoming energized, opens its back contact 66, thereby breaking the stick circuit previously traced for relay $A^{2n}$, and thus causing relay $A^{2n}$ to become deenergized. Relay $A^{2n}$, upon becoming deenergized, completes at its back contact 68 a stick circuit for $A^{15r}$, passing from terminal B, through contact 68, contact 69 of relay $A^{15r}$, and the winding of relay $A^{15r}$ to terminal O.

The circuit for operating mechanism *w* of switch F to the normal position will now be open at contact 70 of relay $A^{2n}$, and the reverse energizing circuit for mechanism *w* will be closed, passing from terminal B, through contact 71 of relay $A^{15r}$, and mechanism *w* to terminal O. Mechanism *w* will therefore move switch F to its reverse position. Pole-changer 128 will thereby be reversed, causing relay *f* to be energized by current of reverse polarity. Contact 95 of relay *f* will therefore now close in the right-hand position.

Due to the energization of relays $L^2$ and $L^3$ while relay I has been deenergized, relay G has been energized by a circuit passing from terminal B, including contact 75 of relay $L^3$ in multiple with contact 76 of relay $L^2$, contact 77 of relay I, and the winding of relay G to terminal O. When the dispatcher releases circuit controller M, thereby permitting relay K to become deenergized and open, at its contact 16, the circuit previously traced for relays $U^1$ and $P^1$, the consequent deenergization of relays $U^1$ and $P^1$ will cause relays $L^2$ and $L^3$ to become deenergized and hence, with relay *f* energized in the reverse direction, a switch indication circuit will be completed, passing from portion $q^2$ of battery $Q^2$, through contact 87 of signal $S^7$ in its stop position, secondary winding 17 of transformer $N^3$, contact 85 of signal $S^9$ in its stop position, contact 95 of relay *f* closed in its right-hand position, front point of contact 94 of relay T, wire 83, upper right-hand unit 4 of rectifier $D^7$, winding of relay I, contact 78 of relay G, contact 79 of relay $L^3$, contact 81 of relay $L^2$, lower left-hand unit 4 of rectifier $D^7$, conductor 15, contact 24 of circuit controller M, contact 28 of relay K, primary winding 13 of transformer $N^5$, windings of relay $U^2$ and $P^2$ in multiple with each other and with condenser $a^5$, and conductor 12 back to battery $Q^2$.

It will be noted that the circuit just traced is supplied with constant direct current by battery $Q^2$, and with alternating current by transformer $N^3$. Transformer $N^5$ will, therefore, supply current to rectifier $D^5$ for energizing relay $L^4$. Relays $U^2$ and $P^2$ are now constantly energized by current of reverse polarity, and hence relay $L^6$ is energized by its circuit passing from terminal B, through front point of contact 5 of relay $U^2$, contact 6 of relay $P^2$ in its right-hand position, and the winding of relay $L^6$ to terminal O.

With relays $L^4$ and $L^6$ energized, a circuit is completed for energizing indicator $e^{Fr}$, passing from terminal B, through the front point of contact 106 of relay $L^4$, back point of contact 117 of relay $R^3$, back point of contact 118 of relay $R^4$, back point of contact 119 of relay $L^5$, contact 121 of relay $L^6$, and indicator $e^{Fr}$ to terminal O. With indicator $e^{Fr}$ lighted, the dispatcher will be informed that switch F occupies its reverse position.

I will next assume that the dispatcher desires to return switch F to its normal position. He will therefore close contact $m^2$, and will again depress controller M. The circuit for transformer $N^1$ and relays $U^1$ and $P^1$ will now be supplied with current of positive polarity from portion $q^1$ of battery $Q^1$ periodically interrupted 40 times per minute, and alternated with current of negative polarity from portion $q^2$ of battery $Q^1$ periodically interrupted 40 times per minute. The path by which the current of positive polarity is supplied to this circuit includes portion $q^1$ of battery $Q^1$, and the back point of contact 22 of coder $C^1$, as well as contact $m^2$. The path by which current of negative polarity is supplied to this circuit includes portion $q^2$ of battery $Q^1$, and the front point of contact 22 of coder $C^1$, as well as contact $m^2$.

Secondary winding 17 of transformer $N^4$ is not included in either one of these paths, and hence no alternating current is now supplied to the circuit by transformer $N^4$. Relay $L^1$ will therefore remain deenergized.

The current of positive polarity alternated with the current of negative polarity at the frequency of 40 cycles per minute will cause contact 5 of relay $U^1$ to close, at its front point, 80 times per minute, and also to close, at its back point, 80 times per minute. This will cause current to be generated by secondary 8 of transformer $N^2$ of a frequency to which the circuit for rectifier $D^1$ is tuned, and hence relay $R^1$ will become energized. Relays $L^2$ and $L^3$ will be energized by their circuits through the front point of contact 5 of relay $U^1$, and contact 6 of relay $P^1$ in its normal and reverse positions, respectively.

With relays $R^1$, $L^2$ and $L^3$ energized, a pick-up circuit will be completed for relay $A^{2n}$, passing from terminal B, through the back point of contact 30 of relay $L^1$, front point of contact 31 of relay $R^1$, front point of contact 35 of relay $L^2$, front point of control 36 of relay $L^3$, contact 62 of relay $H^9$, contact 63 of relay $H^7$, and the winding of relay $A^{2n}$ to terminal O. Relay $A^{2n}$, upon becoming energized, opens its back contact 68, thereby breaking the stick circuit previously traced for relay $A^{15r}$, and hence causing relay $A^{15r}$ to become deenergized. Relay $A^{15r}$, upon becoming deenergized, permits its back contact 66 to complete the stick circuit previously traced for relay $A^{2n}$.

With relay $A^{2n}$ now energized, mechanism *w* will be energized by its circuit passing from terminal B, through contact 70 of relay $A^{2n}$, and mechanism *w* to terminal O. Switch F will therefore now be returned to its normal position. With switch F in its normal position, polechanger 128 will be returned to its normal position, causing relay *f* to again close its contact 95 in the left-hand position.

When the dispatcher now releases circuit controller M, a pick-up circuit will be completed for energizing relays I, $U^2$ and $P^2$ which is the same as the stick circuit first traced for relay I except that it includes contact 78 of relay G and contacts 79 and 81 of relays $L^3$ and $L^2$, respectively, instead of contact 82 of relay I. Relay I, upon becoming energized, completes, at its contact 82, the stick circuit first traced for this relay. Relays $U^2$ and $P^2$ will now be energized for causing indicator $e^{Fn}$ to become lighted as previously described.

When the dispatcher desires to return any of the signals S from the proceed position to the stop position, he can do so by closing contact $m^6$ and operating the circuit controller M. This will cause a circuit to be completed for energizing relays $U^1$ and $P^1$, passing from the portion $q^1$ of battery $Q^1$, to conductor 12, thence by the path previously traced through the windings of relays $U^1$ and $P^1$ and primary winding 13 of transformer $N^1$ as far as contact 16 of relay K, and then through contact $m^6$, and contact 19 of coder $C^4$ back to battery $Q^1$. Over this circuit, relays $U^1$ and $P^1$ are energized by direct current, of positive polarity, periodically interrupted 120 times per minute. Relay $U^1$ will therefore close its contact 5 at its front and back points alternately 120 times per minute, causing relay $R^2$ to become energized. Since the circuit is supplied with current of positive polarity, relay $P^1$ will close its contact 6 in the left-hand position, causing relay $L^2$ to become energized.

With relays $R^2$ and $L^2$ energized, a circuit will be completed for energizing relay $J^6$, passing from terminal B, through the back point of contact 30 of relay $L^1$, back point of contact 31 of relay $R^1$, front point of contact 32 of relay $R^2$, front point of contact 38 of relay $L^2$, back point of contact 39 of relay $L^3$, and the winding of relay $J^6$ to terminal O. Relay $J^6$, upon becoming energized, will open its contact 52, thereby breaking the stick circuit for any of the signal control relays $H^5$, $H^7$, $H^9$ and $H^{10}$ controlling a signal which the dispatcher desires to return to the stop position.

Referring now to Figs. $2^a$, $2^b$ and $2^c$, reference characters 1 and $1^a$ designate the rails of a railway track over which traffic normally moves in the direction indicated by the arrow, which I will assume to be the eastbound direction. Rails 1 and $1^a$ are divided by insulated joints 2 into blocks AA—BB, BB—CC, CC—DD, DD—EE, and EE—FF. Each of these blocks is further divided by other insulated joints 2 into two sections. Block AA—BB, for example, is divided into sections AA—*aa* and *aa*—BB. Each track section is provided with a track circuit comprising a battery 3 connected across the rails adjacent one end of the section, and a relay, designated by the reference character T with a distinguishing exponent, connected across the rails adjacent the opposite end of the section.

Adjacent the entrance end of each of the blocks shown complete, and also adjacent the entrance end of the block to the right of point FF, shown in part in Fig. $2^c$, a signal is located for governing eastbound traffic movements. Each of these signals is designated by the reference character S with a distinguishing exponent according to its location. It is here assumed that each of the signals S is of the color light type comprising an upper group of lamps designated by the reference character *u*, and a lower group of lamps designated by the reference character *d*. Each of these groups comprises a green or proceed lamp *g*, a yellow or caution lamp *y*, and a red or stop lamp *r*. It is to be understood, however, that my invention is not limited to signals of this particular type.

The lighting of the lamps of each signal S is controlled by three slow release relays designated by the reference character L with distinguishing exponents of each of which includes the reference character of the associated signal. One of the relays L for each signal S is, in turn, controlled by the back point of a contact 5 of a neutral code following relay designated by the reference character U with a distinguishing exponent corresponding to that of the signal with which it is associated. The other two relays L for each signal S are controlled by the front point of contact 5 of the associated relay U, and by a polar contact 6 of a polarized code following relay P closed in its normal and reverse positions, respectively. Each relay P is distinguished by an exponent corresponding to that of the associated signal.

The relay U and the relay P for each signal are energized in multiple over a line circuit which is controlled by track relays for the sections of the associated block, and by the relays L for the next signal in advance, and also by a coding device designated by the reference character C with a distinguishing exponent corresponding to that of the next signal in advance. The coding devices C are similar to the coders C shown in Figs. $1^a$ and $1^b$, and operate at a low frequency of the order of 80 cycles per minute.

As shown in Fig. $2^c$, the track section immediately to the right of signal $S^F$ is occupied by a train W which is represented by an axle and pair of wheels. The indications, and the meanings of the indications displayed by each of the signals S shown in the drawings, when train W is located as shown, in the section immediately to the right of point FF, are given in the following table.

| Signal | Indication displayed | | Meaning of indication |
|---|---|---|---|
| | Group *u* | Group *d* | |
| $S^F$ | Red | Red | First block ahead of signal $S^F$ is occupied. |
| $S^E$ | Yellow | Red | First block ahead is clear, but second block ahead is occupied. |
| $S^D$ | Yellow | Yellow | First two blocks ahead are clear, but third block ahead is occupied. |
| $S^C$ | Green | Red | First three blocks ahead are clear, but fourth block ahead is occupied. |
| $S^B$ | Green | Yellow | First four blocks ahead are clear, but fifth block ahead is occupied. |
| $S^A$ | Green | Green | First five blocks ahead are clear. |

I will now describe the manner in which these indications are displayed under the conditions shown in the drawings. With train W occupying the section immediately ahead of signal $S^F$, track relay $T^{F1}$ is deenergized, and hence the line circuit for relays $U^F$ and $P^F$ is open, causing these relays to be deenergized. Relays $L^{F2}$ and $L^{F3}$ are therefore also deenergized. Relay $L^{F1}$, however, is energized by a circuit passing from terminal B, through back point of contact 5 of relay $U^F$, and the winding of relay $L^{F1}$ to terminal O.

Lamp *r* of group *u* of signal $S^F$ is therefore lighted by its circuit passing from terminal B, through the back point of contact 161 of relay $L^{F2}$, back point of contact 162 of relay $L^{F3}$, and lamp *r* to terminal O. Lamp *r* of group *d* of the same signal is lighted by a circuit passing from terminal B, through the back point of contact 163 of relay $L^{F2}$, back point of contact 165 of relay $L^{F3}$, and lamp *r* to terminal O.

A circuit is completed for energizing relays $U^E$ and $P^E$ for signal $S^E$ by continuous current of negative polarity, passsing from portion $q^2$ of battery $Q^F$, through contact 154 of relay $L^{F1}$, back point of contact 155 of relay $L^{F3}$, back point of contact 158 of relay $L^{F2}$, contact 159 of relay $T^{E2}$, contact 160 of relay $T^{E1}$, and the winding of relays $U^E$ and $P^E$ in multiple, back to battery $Q^F$. With relays $U^E$ and $P^E$ energized by continuous current of negative polarity, contact 5 of relay $U^E$ will be continuously closed at its front point, and contact 6 of relay $P^E$ will be closed in the right-hand position. With contact 5 of relay $U^E$ open at its back point, relay $L^{E1}$ is deenergized. With contact 5 of relay $U^E$ closed at its front point, and with contact 6 of relay $P^E$ closed in the right-hand position, a circuit is completed for energizing relay $L^{E3}$, passing from terminal B, through the front point of contact 5 of relay $U^E$, contact 6 of relay $P^E$ in the right-hand position, and the winding of relay $L^{E3}$ to terminal O.

Lamp *y* of group *u* of signal $S^E$ is therefore now lighted by a circuit passing from terminal B, through the back point of contact 161 of relay $L^{E2}$, front point of contact 162 of relay $L^{E3}$, and lamp *y* to terminal O. Lamp *r* of group *d* of this signal is now lighted by a second circuit passing from terminal B, through the back point of contact 163 of relay $L^{E2}$, from point of contact 165 of relay $L^{E3}$, back point of contact 164 of relay $L^{E1}$, and lamp *r* to terminal O.

With relays $L^{E1}$ and $L^{E2}$ denergized, and with relay $L^{E3}$ energized, a circuit is completed for energizing relays $U^D$ and $P^D$ by current of negative polarity, periodically interrupted 80 times per minute by coder $C^E$. This circuit passes from portion $q^2$ of battery $Q^E$, through contact 150 of coder $C^E$, back point of contact 153 of relay $L^{E1}$, front point of contact 155 of relay $L^{E3}$, back point of contact 158 of relay $L^{E2}$, contact 159 of relay $T^{D2}$, contact 160 of relay $T^{D1}$, and windings of relays $U^D$ and $P^D$ in multiple back to battery $Q^E$. On account of the current thus supplied to relays $U^E$ and $P^D$ being periodically interrupted, contact 5 of the relay $U^D$ will close alternately at its front and back points. The current being of negative polarity, contact 6 of relay $P^D$ will be closed in the right-hand position. During the periods when contact 5 is closed at its back point, a circuit will be completed for relay $L^{D1}$, and during the periods when contact 5 is closed at its front point, a circuit will be completed for relay $L^{D3}$. Relays $L^{D1}$ and $L^{D3}$, being slow releasing in character, will bridge the open periods of these circuits, and hence their contacts will be constantly closed at their front points. Lamp *y* of group *u* of signal $S^D$ is therefore lighted by its circuit passing from terminal B, through the back point of contact 161 of relay $L^{D2}$, front point of contact 162 of relay $L^{D3}$, and lamp *y* to terminal O. Lamp *y* of group d of signal $S^D$ is lighted by a circuit passing from terminal B, through the back point of contact 163 of relay $L^{D2}$, front point of contact 165 of relay $L^{D3}$, front point of contact 164 of relay $L^{D1}$, and lamp *y* to terminal O.

A circuit is completed for energizing relay $U^C$ and $P^C$ by continuous current of positive polarity. This circuit passes from portion $q^1$ of battery $Q^D$, through the windings of relays $U^C$ and $P^C$ in multiple, contact 160 of relay $T^{C1}$, contact 159 of relay $T^{C2}$, back point of contact 158 of relay $L^{D2}$, front point of contact 155 of relay $L^{D3}$, and front point of contact 153 of relay $L^{D1}$ back to portion $q^1$ of battery $Q^D$. With relays $U^C$ and $P^C$ energized by continuous current of positive polarity, contact 5 of relay $U^C$ is constantly closed at its front point, and contact 6 of relay $P^C$ is closed in the left-hand position. Relays $L^{C1}$ and $L^{C3}$ are therefore deenergized, but relay $L^{C2}$ is energized by its circuit passing from terminal B, through the front point of contact 5 of relay $U^C$, contact 6 of relay $P^C$ closed in the left-hand position, and the winding of relay $L^{C2}$ to terminal O.

Lamp *g* of group *u* of signal $S^C$ is therefore lighted by its circuit passing from terminal B, through the front point of contact 161 of relay $L^{C2}$, and lamp *g* to terminal O. Red lamp *r* of group *d* is now lighted by a third circuit, passing from terminal B, through the front point of contact 163 of relay $L^{C2}$, back point of contact 167 of relay $L^{C3}$, back point of contact 166 of relay $L^{C1}$, and lamp *r* to terminal O.

A circuit is completed for energizing relay $U^B$ and $P^B$ by current of positive polarity periodically interrupted at a frequency of 80 times per minute, passing from portion $q^1$ of battery $Q^C$, through the windings of relay $U^B$ and $P^B$ in multiple, contact 160 of relay $T^{B1}$, contact 159 of relay $T^{B2}$, front point of contact 158 of relay $L^{C2}$, back point of contact 157 of relay $L^{C1}$, back contact 156 of relay $L^{C3}$, and contact 151 of coder $C^C$ back to portion $q^1$ of battery $Q^C$. With relays $U^B$ and $P^B$ energized by periodically interrupted current of positive polarity, relays $L^{B2}$ and $L^{B1}$ are energized by circuits which are similar, respectively, to those traced for corresponding relays $L^{C2}$ and $L^{D1}$, and relay $L^{B3}$ is deenergized.

Lamp *g* of group *u* of signal $S^B$ is therefore lighted by its circuit which is similar to that previously traced for lamp *g* of signal $S^C$. Lamp *y* of group *d* of signal $S^B$ is lighted by a circuit passing from terminal B, through the front point of contact 163 of relay $L^{B2}$, back point of contact 167 of relay $L^{B3}$, front point of contact 166 of relay $L^{B1}$, and lamp *y* to terminal O.

A circuit is completed for energizing relays $U^A$ and $P^A$ by current of positive polarity periodically alternated with current of negative polarity from battery $Q^B$. This circuit, when supplied with current of positive polarity, passes from portion $q^1$ of battery $Q^B$, through the windings of relays $U^A$ and $P^A$ in multiple, contact 160 of relay $T^{A1}$, contact 159 of relay $T^{A2}$, front point of contact 158 of relay $L^{B2}$, front point of contact 157 of relay $L^{B1}$, and the back point of contact 152 of coder $C^B$ back to portion $q^1$ of battery $Q^B$. During the periods when current of negative polarity is supplied to this circuit, the circuit includes portion $q^2$ of battery $Q^B$, and the front point of contact 152 of coder $C^B$, instead of portion $q^1$ of battery $Q^B$ and the back point of contact 152 of coder $C^B$. Relays $U^A$ is thus being energized 80 times per minute by current of positive polarity, alternately with current of negative polarity. Relay $U^A$ is therefore energized 160 times per minute, and causes its contact 5 to close, at its front point and also at its back point, 160 times per minute. Relay $P^A$ being similarly energized, its contact 6 will close in its left-hand position alternately with its right-hand position 80 times per minute. Each of the relays $L^{A1}$, $L^{A2}$, and $L^{A3}$ is therefore energized by its circuit which is similar to a corresponding circuit previously traced.

Lamp *g* of group *u* of signal $S^A$ is therefore lighted by its circuit which is similar to that previously traced for signal $S^C$. Lamp *g* of group *d* of signal $S^A$ is lighted by a circuit passing from terminal B, through the front point of contact 163 of relay $L^{A2}$, front point of contact 167 of relay $L^{A3}$, contact 168 of relay $L^{A1}$, and lamp *g* to terminal O.

Referring now to Figs. $3^a$, $3^b$ and $3^c$, the stretch of track shown here is the same as that shown in Figs. $2^a$, $2^b$ and $2^c$ between points AA and EE. Whereas in Figs. $2^a$, $2^b$ and $2^c$ five complete railway blocks are shown, only four such blocks are shown in Figs. $3^a$ $3^b$ and $3^c$. The signals shown in Figs. $3^a$, $3^b$ and $3^c$ are the same as the corresponding signals in Figs. $2^a$, $2^b$ and $2^c$. In Figs. $3^a$, $3^b$ and $3^c$, however the signals are controlled by traffic conditions in only four blocks in advance, whereas in Figs. $2^a$, $2^b$ and $2^c$, the signals are controlled by traffic conditions in five blocks in advance.

In Figs. $3^a$, $3^b$ and $3^c$, the lighting of the lamps of each signal S is controlled by two line control relays, designated by the reference characters V and X with the exponent of the associated signal, which do not need to be of the code following type, and by a slow release relay, designated by the reference character *v* with the exponent of the associated signal, which is controlled by a front contact of the associated relay V. Each relay X is energized by current from a rectifier designated by the reference character D with a corresponding exponent, which, in turn, receives energy from the secondary winding 187 of an associated transformer designated by the reference character N with an exponent corresponding to that of the associated signal. The primary winding 186 of each transformer N is connected in series with the associated relay V in a line circuit controlled by the track relays for the first block ahead of the associated signal, and by the relays V, X, and *v* for the next signal in advance, as well as by the coder C for the next signal in advance.

Each coder C operates at a low frequency of the order of 80 cycles per minute, as in the apparatus of Figs. $2^a$, $2^b$ and $2^c$. In the arrangement here shown, contact 180 of each coder C is connected in multiple with a resistor unit 181. The opening of contact 180 of each coder C does not therefore open the associated line circuit, but merely reduces the current flowing in the line circuit by introducing the resistance 181 in series with the battery Q which supplies current to the line circuit.

As shown in Fig. $3^c$, the track section immediately to the right of signal $S^E$ is occupied by a train W. The indication displayed by each of the signals S under this condition, and the meanings of these indications are given in the following table.

| Signal | Indication displayed | | Meaning of indication |
|---|---|---|---|
| | Group *u* | Group *d* | |
| SE | Red | Red | First block ahead is occupied. |
| SD | Yellow | Red | First block clear, second block is occupied. |
| SC | Yellow | Yellow | First two blocks ahead clear, third block occupied. |
| SB | Green | Yellow | First three blocks clear, fourth block occupied. |
| SA | Green | Green | First four blocks clear. |

I will now describe the manner in which these indications are displayed when train W is in the section immediately ahead of signal $S^E$. Under these conditions, relay $T^{E1}$ is deenergized, and hence the line circuit for relay $V^E$ and transformer $N^E$ is open at contact 185 of relay $T^{E1}$. Relays $V^E$, $v^E$ and $X^E$ are therefore deenergized.

Lamp *r* of group *u* of signal $S^E$ is lighted by a circuit passing from terminal B, through the back point of contact 192 of relay $v^E$, and lamp *r* to terminal O. Lamp *r* of the lower group *d* is lighted by a circuit passing from terminal B, through the back point of contact 194 of relay $v^E$, and lamp *r* to terminal O.

Relay $V^D$ is energized by continuous current of positive polarity in a circuit passing from battery $Q^{E1}$, through a resistance unit 190, back point of contact 183 of relay $v^E$, contact 184 of relay $T^{D2}$, contact 185 of relay $T^{D1}$, winding of relay $V^D$, primary winding 186 of transformer $N^D$, and back point of contact 188 of relay $v^E$, back to battery $Q^{E1}$. Transformer $N^D$ does not respond to the constant unidirectional current flowing in this circuit, and hence relay $X^D$ remains deenergized. With relay $V^D$ energized in the normal direction, its front contact 197 is closed, and its polar contacts 191 and 196 are closed in their left-hand position. With the front contact of relay $V^D$ closed, relay $v^D$ is energized by a circuit passing from terminal B, through contact 197 of relay $V^D$, and the winding of relay $v^D$ to terminal O.

With relay $v^D$ energized, and with relay $V^D$ energized by current of positive polarity, lamp *y* of group *u* of signal $S^D$ is lighted by a circuit passing from terminal B, through front point of contact 192 of relay $v^D$, back point of contact 193 of relay $X^D$, and lamp *y* to terminal O. Lamp *r* of group *d* of signal $S^D$ is lighted by a second circuit passing from terminal B, through the front point of contact 194 of relay $v^D$, contact 196 of relay $V^D$ closed in the left-hand position, back point of contact 195 of relay $X^D$, and lamp *r* to terminal O.

Relay $V^C$ is energized by constant current of negative polarity passing from battery $Q^{D1}$, through a resistor 190, contact 191 of relay $V^D$ in its left-hand position, back point of contact 189 of relay $X^D$, front point of contact 188 of relay $v^D$, primary winding 186 of transformer $N^C$, winding of relay $V^C$, contact 185 of relay $T^{C1}$, contact 184 of relay $T^{C2}$, front point of contact 183 of relay $v^D$, and back point of contact 182 of relay $X^D$ back to battery $Q^{D1}$. Transformer $N^C$ does not respond to the constant unidirectional current flowing in this circuit, and hence relay $X^C$ remains deenergized. Relay $V^C$ is energized in the reverse direction, and hence its polar contacts 191 and 196 are closed in their right-hand positions. With front contact 197 of relay $V^C$ energized, relay $v^C$ is energized similarly to relay $v^D$ previously described.

With relay $V^C$ energized in the reverse direction, and with relay $v^C$ energized, lamp *y* of group *u* of signal $S^C$ is energized by a circuit which is similar to the circuit traced for lamp *y* of group *u* of signal $S^D$. Lamp *y* of group *d* of signal $S^C$ is lighted by a circuit passing from terminal B, through the front point of contact 194 of relay $v^C$, contact 196 of relay $V^C$ in its right-hand position, and lamp *y* to terminal O.

Relay $V^B$ and primary winding 186 of transformer $N^B$ are energized by current of negative polarity, periodically varied by coder $C^C$, over a circuit passing from battery $Q^{C1}$, through contact 180 of coder $C^C$ in multiple with a resistor 181, contact 191 of relay $V^C$ in its right-hand position, back point of contact 189 of relay $X^C$, front point of contact 188 of relay $v^C$, primary winding 186 of transformer $N^B$, winding of relay $V^B$, contact 185 of relay $T^{B1}$, contact 184 of relay $T^{B2}$, front point of contact 183 of relay $v^C$, and back point of contact 182 of relay $X^C$ back to battery $Q^{C1}$. Transformer $N^B$ and relay $X^B$ are so proportioned that the periodically varied current supplied to primary winding 186 of transformer $N^B$ will operate relay $X^B$ through rectifier $D^B$. The coded current of negative polarity causes polar contacts 191 and 196 of relay $V^B$ to be closed in their right-hand positions.

Lamp *g* of group *u* of signal $S^B$ is therefore lighted by a circuit passing from terminal B, through the front point of contact 192 of relay $v^B$, front point of contact 193 of relay $X^B$, and lamp *g* to terminal O. Lamp *y* of group *d* of signal $S^B$ is lighted by a circuit which is similar to the circuit traced for the corresponding lamp of signal $S^C$.

Relay $V^A$ and primary winding 186 of transformer $N^A$ are energized by current of positive polarity, periodically varied by coder $C^B$, over a circuit passing from battery $Q^{B1}$ through contact 180 of coder $C^B$ in multiple with a resistor 181, front point of contact 182 of relay $X^B$, front point of contact 183 of relay $v^B$, contact 184 of relay $T^{A2}$, contact 185 of relay $T^{A1}$, winding of relay $V^A$, primary winding 186 of transformer $N^A$, front point of contact 188 of relay $v^B$, and front point of contact 189 of relay $X^B$ back to battery $Q^{B1}$. Contacts 191 and 196 of relay $V^A$ are therefore closed in the left-hand position, and relay $X^A$ is energized.

Lamp *g* of group *u* of signal $S^A$ is therefore lighted by a circuit which is similar to the circuit traced for the corresponding lamp of signal $S^B$. Lamp *g* of group *d* of signal $S^A$ is lighted by a circuit passing from terminal B, through the front point of contact 194 of relay $v^A$, contact 196 of relay $V^A$ closed in its left-hand position, front point of contact 195 of relay $X^A$, and lamp $g$ to terminal O.

Fig. 4 shows a modification of the four-block signaling system provided in Figs. $3^a$, $3^b$ and $3^c$. The portion of the control apparatus at each signal, comprising a transformer N, a rectifier D and a relay X in Figs. $3^a$, $3^b$ and $3^c$, is replaced by a relay U and two slow releasing relays L in the arrangement of Fig. 4. In the arrangement shown in Fig. 4, each polarized relay V is of a type having neutral contacts which are slow to release. Whereas in Figs. $3^a$, $3^b$, and $3^c$ each coder C periodically decreases the current supplied to its line circuit by opening its contact 180, the coder $C^A$, shown in Fig. 4, periodically interrupts the current supplied to the line circuit for the next signal in the rear. The line circuits and the signal light circuits of Fig. 4 are similar to those of Figs. $3^a$, $3^b$, and $3^c$.

In Fig. 4, if relay $T^{A1}$ is deenergized by a train in the section directly ahead of signal $S^A$, relays $V^A$ and $U^A$ will be deenergized. With relay $U^A$ deenergized, relay $L^{A1}$ will be energized by a circuit passing from terminal B, through the back point of contact 209 of relay $U^A$, and the winding of relay $L^{A1}$ to terminal O. Relay $L^{A2}$ will be deenergized since its circuit will be open at the front point of contact 209 of relay $U^A$.

With relay $V^A$ deenergized, lamp $r$ of group $u$ of signal $S^A$ would be lighted by a circuit including the back point of contact 205 of relay $V^A$, and lamp $r$ of group $d$ would be lighted by a circuit including the back point of contact 207 of relay $V^A$.

With relays $V^A$ and $L^{A2}$ deenergized, continuous current of positive polarity is supplied to the line circuit for the signal in the rear of signal $S^A$, from battery $Q^{A1}$, through the back points of contacts 202 and 203 of relay $V^A$.

If the first block ahead of signal $S^A$ is clear and the second block ahead is occupied, relay $V^A$ will be energized by continuous current of positive polarity, supplied to the line circuit by the battery Q at the next signal in advance in the manner just described in connection with the line circuit for the first signal in the rear of signal $S^A$. Relay $U^A$, being therefore also energized by this same continuous current of positive polarity, will retain its contact 209 closed at its front point. Relay $L^{A1}$ will therefore be deenergized, and its contact 210 will be open, and hence relay $L^{A2}$ will also be deenergized.

Under this condition, lamp $y$ of group $u$ of signal $S^A$ will be lighted by its circuit passing from terminal B, through the front point of contact 205 of relay $V^A$, back point of contact 206 of relay $L^{A2}$, and lamp $y$ to terminal O. Lamp $r$ of group $d$ will be lighted by a circuit passing from terminal B, through the front point of contact 207 of relay $V^A$, contact 196 of relay $V^A$ in the left-hand position, back point of contact 208 of relay $L^{A2}$, and lamp $r$ to terminal O.

With relay $V^A$ energized by current of positive polarity while relay $L^{A2}$ is deenergized, current of negative polarity will be supplied by battery $Q^{A1}$ to the line circuit for the signal next in the rear, passing from battery $Q^{A1}$, through contact 191 of relay $V^A$ in its left-hand position, back point of contact 204 of relay $L^{A2}$, front point of contact 203 of relay $V^A$, and returning to battery $Q^{A1}$ through the front point of contact 202 of relay $V^A$, and the back point of contact 201 of relay $L^{A2}$.

If the first two blocks ahead of signal $S^A$ are clear and the third block ahead is occupied, continuous current of negative polarity will be supplied to the windings of relays $V^A$ and $U^A$ in the manner just described in connection with the line circuit for the signal next in the rear of signal $S^A$. The polar contacts of relay $V^A$ will therefore be closed in the right-hand position, and relay $U^A$ will be energized as before. Relays $L^{A1}$ and $L^{A2}$ will therefore be deenergized as before.

Lamp $y$ of group $u$ of Signal $S^A$ will then be lighted by its circuit previously traced. Lamp $y$ of group $d$ will also be lighted by its circuit passing from terminal B, through the front point of contact 207 of relay $V^A$, contact 196 of relay $V^A$ in its right-hand position, and lamp $y$ to terminal O.

With relay $V^A$ energized in the reverse direction, and with relay $L^{A2}$ deenergized, the relays V and U for the signal next in the rear will be energized by coded current of negative polarity flowing from battery $Q^{A1}$, through contact 180 of coder $C^A$, contact 191 of relay $V^A$ in its right-hand position, back point of contact 204 of relay $L^{A2}$, front point of contact 203 of relay $V^A$, and returning over the line circuit through the front point of contact 202 of relay $V^A$, and back point of contact 201 of relay $L^{A2}$ back to battery $Q^{A1}$.

If three blocks ahead of signal $S^A$ are clear and the fourth block is occupied, relays $V^A$ and $U^A$ will be energized by coded current of negative polarity from the battery at the signal next in advance of signal $S^A$, similarly to the manner just described for the relays V and U for the signal next in the rear of signal $S^A$. With relay $V^A$ energized by coded current of negative polarity, contacts 191 and 196 of this relay will be closed in the right-hand position. With relay $U^A$ energized by coded current, contact 209 of this relay will alternately close at its front and back points causing relay $L^{A1}$ to be energized periodically through the back point of contact 209. Relay $L^{A1}$ being slow releasing in character, will retain its front contact 210 closed during the intervals between the closing of contact 209 of relay $U^A$ at the back point. A circuit will therefore be completed for energizing relay $L^{A2}$ during the periods when contact 209 is closed at its front point, passing from terminal B, through the front point of contact 209 of relay $U^A$, contact 210 of relay $L^{A1}$, and the winding of relay $L^{A2}$ to terminal O.

Lamp $g$ of group $u$ of signal $S^A$ will now be lighted by a circuit passing from terminal B, through the front point of contact 205 of relay $V^A$, front point of contact 206 of relay $L^{A2}$, and lamp $g$ to terminal O. Lamp $y$ of group $d$ will also be lighted by its circuit previously traced.

Battery $Q^{A1}$ will now supply coded current of positive polarity for energizing relays V and U for the signal next in the rear by a circuit passing from battery $Q^{A1}$, through contact 180 of coder $C^A$, front point of contact 201 of relay $L^{A2}$, front point of contact 202 of relay $V^A$, and returning through the front point of contact 203 of relay $V^A$, and the front point of contact 204 of relay $L^{A2}$ to battery $Q^{A1}$.

If the first four blocks in advance of signal $S^A$ are clear, the line circuit for relays $V^A$ and $U^A$ will be supplied with coded current of positive polarity from the battery for the signal next in advance of signal $S^A$ similarly to the manner just described for the relays V and U for the signal next in the rear of signal $S^A$. Relays $L^{A1}$ and $L^{A2}$ will now be energized as previously described in connection with coded current of negative polarity. Relay $V^A$, on account of being energized by current of positive polarity, will close its contacts 191 and 196 in the left-hand position.

Lamp $g$ of group $u$ of signal $S^A$ will be energized by its circuit previously traced. Lamp $g$ of group $d$ will now also be energized by a circuit passing from terminal B, through the front point of contact 207 of relay $V^A$, contact 196 of relay $V^A$ in the left-hand position, front point of contact 208 of relay $L^{A2}$ and lamp $g$ to terminal O.

In Fig. 5, line control relays V and X are operated by periodically varied current of positive or negative polarity, and relay V is also operated by constant current of positive or negative polarity, similarly to the manner in which relays V and X of Figs. $3^a$, $3^b$, and $3^c$ are operated. In Fig. 5, the various control currents are selected by track relays $T^1$ and $T^2$ instead of by line relays as in Figs. $3^a$, $3^b$ and $3^c$. Instead of controlling a signal S, relays V and X in Fig. 5 control two indicator lamps designated by the reference characters $e^{51}$ and $e^{52}$.

As shown in the drawings, both relays $T^1$ and $T^2$ are energized. Constant current of positive polarity is therefore supplied for energizing relay V by a circuit passing from portion $q^2$ of battery Q, through the front point of contact 222 of relay $T^1$, front point of contact 223 of relay $T^2$, winding of relay V, and the primary winding 224 of transformer N back to battery Q. Transformer N does not respond to this constant current, and hence relay X remains deenergized. Since relay V is energized by current of positive polarity, its polar contact 229 is open. Both lamps $e^{51}$ and $e^{52}$ are therefore deenergized.

I will now assume that a train enters the track section with which relay $T^1$ is connected, causing relay $T^1$ to become deenergized. Relay $T^1$, upon becoming deenergized, causes a coder C to become energized by a circuit passing from terminal B, through contact 228 of relay $T^1$, contact 11 of coder C, and winding of coder C to terminal O. Current of positive polarity periodically interrupted by coder C at a frequency of the order of 80 times per minute, will therefore be supplied by portion $q^2$ of battery Q, through contact 221 of coder C, back point of contact 222 of relay $T^1$, and thence over the circuit previously traced back to battery Q. Since the polarity of the current by which relay V is energized is still positive, contact 229 of relay V will remain open. Transformer N and relay X are so proportioned that the coded current now supplied to transformer N will cause relay X to become energized. With relay X energized, lamp $e^{51}$ will be lighted by its circuit passing from terminal B, through contact 230 of relay X, and lamp $e^{51}$ to terminal O.

If now the train proceeds into the section with which relay $T^2$ is connected, coded current of negative polarity will be supplied by portion $q^1$ of battery Q to relay V and transformer N by a circuit passing from portion $q^1$ of battery Q, through primary winding 224 of transformer N, winding of relay V, back point of contact 223 of relay $T^2$, back point of contact 226 of relay $T^1$, and contact 227 of coder C back to battery Q. Since the polarity of the current is now negative, contact 229 of relay V will become closed, and hence lamp $e^{52}$ will be energized by its circuit including contact 229 of relay V. Relay X will now be energized on account of transformer N being supplied with coded current of negative polarity. Both lamps $e^{51}$ and $e^{52}$ will therefore be lighted as long as the train occupies both the track sections shown in the drawings.

If now the train leaves the first section, permitting relay $T^1$ to again become energized, but continuing to deenergize relay $T^2$, relay V will be energized by constant current of negative polarity supplied by portion $q^1$ of battery Q over the circuit previously traced as far as the back point of contact 223 of relay $T^2$, thence passing through the front point of contact 226 of relay $T^1$ back to battery Q. With relay V thus energized by current of negative polarity, lamp $e^{52}$ will continue lighted. Since the current now supplied to transformer N is constant, relay X will become deenergized, therefore opening the circuit for lamp $e^{51}$. Hence while relay $T^1$ is energized and relay $T^2$ is deenergized, lamp $e^{52}$ only will be lighted.

From the foregoing description and the accompanying drawings, it will be understood that my invention provides apparatus at a control point for selectively supplying, to a single pair of conductors, constant unidirectional current of normal and reverse polarities, variously coded unidirectional current of normal and reverse polarities, current of normal polarity periodically alternated with current of reverse polarity at a low frequency of the order of 40 or 60 times per minute, alternating current having a frequency of the order of 60 cycles per second, and the combination of such alternating current with each of the other forms of current which I have enumerated. My invention also provides apparatus arranged to selectively respond to each of these forms of current carried by the pair of conductors. My invention further provides apparatus at a second point for supplying to the same pair of conductors currents of various forms which may be similar to the currents supplied to the conductors at the control point. My invention also further provides indication apparatus arranged to selectively respond to the current supplied to the conductors at the second point but also so arranged as not to be affected by the current supplied to the conductors at the control point. At the same time, my invention provides means for preventing the operation of control apparatus at the second point by the indication currents.

Although, for the sake of simplicity of the drawings and specification, I have shown the unidirectional current varied at only a few codes, I wish it to be understood that my invention is not limited to apparatus which employs only these few codes. By increasing the number of codes employed, the number of combinations of control and indication conditions can be greatly increased for selectively controlling a much larger number of electroresponsive devices by apparatus also embodying my invention.

With apparatus arranged as shown in Figs. $1^a$ and $1^b$, continuous indication is provided at the control point to show the condition of apparatus at the remote point. When the condition of the apparatus at the remote point becomes changed, the indication apparatus is automatically controlled to quickly show such change. The dispatcher can, however, at any time interrupt an indication control circuit in order to complete a circuit for operating one of the traffic governing devices at the remote point. When the dispatcher permits the master circuit controller to return to its normal position, an indication circuit is automatically completed.

In Figs. $1^a$ and $1^b$, my invention is shown applied for controlling a plurality of traffic governing devices manually from a central location such, for example, as a dispatcher's office or an interlocking tower, and for indicating the condition of such traffic governing devices at the control point. In Figs. $2^a$, $2^b$, and $2^c$, Figs. $3^a$, $3^b$, and $3^c$ and Fig. 4, my invention is shown applied to five block and four block automatic signal control systems. In Fig. 5, a modification of Figs. $3^a$, $3^b$, and $3^c$ is shown by which a plurality of track circuit indications may be controlled over a single pair of line wires.

Although I have herein shown and described only a few forms of railway traffic controlling apparatus embodying my invention, it is understood that various changes and modifications may be made therein within the scope of the appended claims without departing from the spirit and scope of my invention.

Having thus described my invention, what I claim is:

1. In combination, a plurality of railway traffic governing devices for governing traffic movements over a given stretch of railway track, a pair of conductors, control means for supplying periodically varied unidirectional current as well as alternating current to said conductors, and electroresponsive apparatus selectively controlled by said currents carried by said conductors for selectively controlling one of said traffic governing devices if said periodically varied unidirectional current is supplied to said conductors without said alternating current and for selectively controlling a second one of said traffic governing devices if said alternating current is supplied to said conductors without said periodically varied unidirectional current and for selectively controlling a third one of said traffic governing devices if said periodically varied unidirectional current and said alternating current are simultaneously supplied to said conductors, said electro-responsive apparatus comprising means for preventing control of said first and third traffic governing devices if constant unidirectional current is supplied to said conductors.

2. In combination, a pair of conductors, a direct current source for supplying said conductors with constant current of a given polarity, a second direct current source for supplying said conductors with constant current of the opposite polarity, means for periodically connecting said first and second sources alternately to said conductors at each of a plurality of codes, a plurality of electrical devices, and apparatus comprising two relays each responsive to said constant current of a given polarity and to said constant current of the opposite polarity and also to said alternated currents for controlling each of said electrical devices so that current of each form controls an electrical device which is different from the device which is controlled by current of each of the other forms.

3. In combination, a plurality of railway traffic governing devices for governing traffic movements over a given stretch of railway track, a pair of conductors, a plurality of indication devices associated with said conductors, control means for at times disassociating said indication devices from said conductors and for supplying continuous unidirectional current and periodically interrupted unidirectional current as well as alternating current to said conductors, electroresponsive apparatus controlled by said currents carried by said conductors for selectively controlling said traffic governing devices, and means responsive to said traffic governing devices for at other times supplying continuous unidirectional current or periodically interrupted unidirectional current contemporaneously with alternating current to said conductors for selectively controlling said indication devices.

4. In combination, a pair of conductors, means for supplying said conductors with constant unidirectional current of a given polarity, means for supplying said conductors with current of positive polarity periodically alternated with current of negative polarity from a direct current source, an electrical device, a second electrical device, and a given relay controlled by each of said currents for selectively controlling said first or said second electrical device according as said constant unidirectional current or said alternated currents are supplied to said conductors.

5. In combination, a pair of conductors, means for supplying said conductors with unidirectional current of a given polarity, a direct current source for supplying said conductors with current of positive polarity periodically alternated with current of negative polarity, an alternating current source for supplying said conductors with alternating current, a plurality of devices, and electrical apparatus comprising a neutral relay energized in a first or a second manner and a transformer energized in a third manner according as said conductors are supplied with said first or said second or said third current respectively for selectively controlling said plurality of devices.

6. In combination, a pair of conductors, a direct current source for supplying said conductors with current of positive polarity periodically alternated with current of negative polarity, an alternating current source for supplying said conductors with alternating current, a first and a second device, and electrical apparatus comprising a neutral relay responsive only to current from the direct current source and a transformer responsive only to current from the alternating current source for selectively controlling said first and said second devices.

7. In combination, a pair of conductors, means for supplying said conductors with periodically varied unidirectional current, means for supplying said conductors with alternating current of low frequency of the order of 40 or 60 cycles per minute, means for supplying said conductors with alternating current of a higher frequency of the order of 60 cycles per second, a first and a second and a third device, electrical apparatus comprising a transformer as well as a neutral and a polarized relay controlled by and arranged to respond distinctively to each of said forms of current carried by said conductors, means controlled by said transformer for controlling said first device if and only if said transformer is energized by said alternating current of higher frequency from said conductors, and means controlled by said neutral and polarized relays for selectively controlling said second or said third device if and only if said neutral and polarized relays are both energized by said periodically varied unidirectional current or by said alternating current of low frequency respectively from said conductors.

8. In combination, a pair of conductors, means for supplying said conductors with continuous unidirectional current of a given polarity, means for supplying said conductors with alternating current of low frequency of the order of 40 or 60 cycles for minute, means for supplying said conductors with periodically varied unidirectional current, means for supplying said conductors with alternating current of higher frequency of the order of 60 cycles per second, a first and a second as well as a third and a fourth device, electrical apparatus comprising a transformer as well as a neutral and a polarized relay controlled by and arranged to respond distinctively to each of said forms of current carried by said conductors, means controlled by said transformer for controlling said first device if and ony if said transformer is energized by said alternating current of higher frequency from said conductors, and means controlled by said neutral and polarized relays for selectively controlling said second or said third or said fourth device if and only if said neutral and polarized relays are both energized by said continuous unidirectional current or by said alternating current of low frequency or by said periodically varied unidirectional current respectively from said conductors.

9. In combination, a pair of conductors, means for supplying said conductors with continuous unidirectional current of a given polarity, means for supplying said conductors with alternating current of low frequency of the order of 40 or 60 cycles per minute, means for supplying said conductors with periodically varied unidirectional current, a first and a second and a third device, electrical apparatus comprising a neutral relay and a polarized relay each controlled by and arranged to respond distinctively to each of said forms of current carried by said conductors, and means controlled by said neutral and polarized relays for selectively controlling said first or said second or said third device if and only if said neutral and polarized relays are both energized by said continuous current or by said alternating current or by said periodically varied unidirectional current respectively from said conductors.

10. In combination, a pair of conductors, means for supplying said conductors with constant unidirectional current, means for supplying said conductors with periodically varied unidirectional current, means for supplying said conductors with alternating current, a plurality of devices, and electrical apparatus comprising a neutral relay energized in a first or a second manner and a transformer energized in a third manner according as said conductors are supplied with said first or said second or said third current respectively for selectively controlling said plurality of devices.

11. In combination, a pair of conductors, control means for supplying continuous current of positive polarity to said conductors, control means for supplying continuous current of negative polarity to said conductors, control means for supplying periodically varied current of positive polarity to said conductors, control means for supplying periodically varied current of negative polarity to said conductors, a source of unidirectional current, a second source of unidirectional current, control means for supplying said conductors with current of positive polarity from said first unidirectional current source periodically alternated with current of negative polarity from said second unidirectional current source, a plurality of devices, electro-responsive apparatus comprising a neutral relay and a polarized relay each controlled by each of said currents carried by said conductors, and means controlled by said neutral and polarized relays in response to energization by each of said currents for controlling said devices so that each of said currents controls a different device from that which is controlled by each of the other currents.

12. In combination, a pair of conductors, means for supplying said conductors with continuous current of positive polarity, means for supplying said conductors with continuous current of negative polarity, means for supplying said conductors with periodically varied current of positive polarity, means for supplying said conductors with periodically varied current of negative polarity, means for supplying said conductors with alternating current of low frequency of the order of 40 or 60 cycles per minute, a plurality of devices one associated with each of said forms of current, electro-responsive apparatus comprising a neutral relay and a polarized relay controlled by and arranged to respond distinctly to each of said forms of current carried by said conductors, and means controlled by said neutral and polarized relays for selectively controlling each of said devices if and only if said neutral and polarized relays are both energized by the form of current with which each device is associated.

13. In combination, a pair of conductors, means for supplying said conductors with continuous current of positive polarity, means for supplying said conductors with continuous current of negative polarity, means for supplying said conductors with pediodically varied current of positive polarity, means for supplying said conductors with periodically varied current of negative polarity, a plurality of devices, electro-responsive apparatus comprising a neutral relay and a polarized relay controlled by and arranged to respond distinctively to each of said forms of current carried by said conductors, and means controlled by said neutral and polarized relays in response to energization by each of said currents for controlling said devices so that each of said currents controls a different device from that which is controlled by each of the other currents.

14. In combination, a pair of conductors, means for supplying said conductors with continuous current of positive polarity, means for supplying said conductors with continuous current of negative polarity, means for supplying said conductors with periodically varied current of positive polarity, means for supplying said conductors with periodically varied current of negative polarity, means for supplying said conductors with alternating current of low frequency of the order of 40 or 60 cycles per minute, means for supplying said conductors with alternating current of a higher frequency of the order of 60 cycles per second, a plurality of devices one associated with each of said currents, electro-responsive apparatus comprising a transformer as well as a neutral and a polarized relay controlled by and arranged to respond distinctively to each of said forms of current carried by said conductors, means controlled by said transformer for controlling the associated device if said transformer is energized by said alternating current of higher frequency from said conductors, and means controlled by said neutral and polarized relays for selectively controlling each of the other said devices when said relays are energized by the current with which each of the other said devices is associated.

15. In combination, a pair of conductors, means for supplying said conductors with continuous current of positive polarity, means for supplying said conductors with continuous current of negative polarity, means for supplying said conductors with periodically varied current of positive polarity, means for supplying said conductors with periodically varied current of negative polarity, means for supplying said conductors with alternating current of low frequency of the order of 40 or 60 cycles per minute, a neutral relay connected across said conductors, a front contact operated by said relay and arranged to be closed while said relay is energized by current of positive or negative polarity but arranged to open at each periodic variation of said periodically varied currents of positive or negative polarity and also to open at each reversal of said alternating current, a back contact operated by said relay and arranged to close at each periodic variation of said periodically varied currents of positive or negative polarity and also to close at each reversal of said alternating current, a polarized relay connected in multiple with said neutral relay, a polar contact operated by said polarized relay arranged to become closed in its normal position each time continuous or periodically varied current of positive polarity is supplied to said relay and also during the positive part of each cycle of said alternating current and arranged to become closed in its reverse position each time continuous or periodically varied current of negative polarity is supplied to said relay and also during the negative part of each cycle of said alternating current, and a plurality of electrical devices selectively controlled by said front and back and polar contacts.

16. In combination, a pair of conductors, means for supplying said conductors with continuous current of positive polarity, means for supplying said conductors with continuous current of negative polarity, means for supplying said conductors with alternating current of low frequency of the order of 40 or 60 cycles per minute, a neutral relay connected across said conductors arranged to close a front contact each time said relay becomes energized by said continuous current of positive or of negative polarity and also during the positive and negative parts of each cycle of said alternating current and arranged to close a back contact at each change of polarity of said alternating current, a polarized relay connected in multiple with said neutral relay arranged to close a polar contact in its normal position each time said relay becomes energized by said continuous current of positive polarity or by the positive part of each cycle of said alternating current and arranged to close said polar contact in its reverse position each time said relay becomes energized by said continuous current of negative polarity or by the negative part of each cycle of said alternating current, and a plurality of electrical devices selectively controlled by said front and back and polar contacts.

17. In combination, a pair of conductors, means for supplying said conductors with continuous current of positive polarity, means for supplying said conductors with continuous current of negative polarity, means for supplying said conductors with periodically varied current of positive polarity, means for supplying said conductors with periodically varied current of negative polarity, means for supplying said conductors with alternating current of low frequency of the order of 40 or 60 cycles per minute, means for supplying said conductors with alternating current of a higher frequency of the order of 60 cycles per second, a neutral and a polarized relay connected in multiple across said conductors and responsive to said continuous and periodically varied currents of positive and negative polarities and to said alternating current of low frequency but not responsive to said alternating current of higher frequency, a condenser connected in multiple with said neutral and polarized relays, an instrument responsive to said alternating current of higher frequency flowing through said condenser but not responsive to said alternating current of low frequency nor to said continuous or periodically varied currents, and a plurality of electrical devices selectively controlled by said instrument and by said neutral and polarized relays.

18. In combination, a pair of conductors, a manually operable push button circuit controller biased to a normal position and having a front contact which is closed only when said controller is in its normal position and also having a back contact which is closed only when said controller is operated to a depressed position, a slow pick-up relay controlled by said back contact, indication apparatus connected across said conductors through said front contact in series with a back contact of said slow pick-up relay, electrical control apparatus connected across said conductors, means for supplying current to said conductors through a front contact of said slow pick-up relay for controlling said electrical control apparatus, and means for supplying current to said conductors for controlling said indication apparatus when the front contact of said push button circuit controller is closed and said slow pick-up relay is deenergized.

19. In combination, a pair of conductors, electrical control apparatus, means for supplying said conductors with current for controlling said electrical control apparatus, a slow release stick relay, a second slow release relay, means controlled by said electrical control apparatus and by said stick relay for controlling said second slow release relay, a pick-up circuit for said stick relay controlled by said electrical control apparatus and by said second slow release relay, indication apparatus, and a stick circuit for said stick relay including said indication apparatus and supplied with current for energizing said indication apparatus in series with said stick relay.

20. A system of five-block automatic signaling comprising a stretch of railway track divided into blocks, a signal for each block capable of displaying six different indications, a control circuit for each signal, means controlled by traffic conditions in five blocks in advance of each signal for energizing said control circuit by continuous current of positive or of negative polarity or for energizing said control circuit by periodically interrupted current of positive or of negative polarity or for energizing said control circuit by alternating current of low frequency of the order of 80 cycles per minute as well as for deenergizing said control circuit, and electro-responsive apparatus controlled by each said control circuit for causing the associated signal to display one of its six different indications corresponding to the one of said five forms of current by which said control circuit is energized or corresponding to the deenergized condition of said control circuit.

21. In combination, a pair of conductors, means for supplying said conductors with continuous current of positive polarity, means for supplying said conductors with continuous current of negative polarity, means for supplying said conductors with periodically varied current of positive polarity, means for supplying said conductors with periodically varied current of negative polarity, a polarized relay connected across said conductors and responsive to each of said forms of current carried by said conductors, a code following relay connected in series with said polarized relay and having a front and a back contact, a slow release relay, a second slow release relay, an energizing circuit for said first slow release relay including said back contact, an energizing circuit for said second slow release relay including said front contact of said code following relay and a front contact of said first slow release relay, a plurality of railway traffic governing devices, and means controlled by said polarized relay and by said second slow release relay for selectively controlling said traffic governing devices.

22. In combination, a pair of conductors extending from a control point to a remote point, a plurality of railway traffic governing devices at said remote point, a control relay at said remote point, a slow release stick relay, a second slow release relay, a push button circuit controller having a front contact and a back contact, a slow pick-up relay, a circuit including said back contact for energizing said slow pick-up relay, an indication relay, a source of current at said control point, a second source of current at said remote point, a circuit including said conductors and said first source of current and also a front contact of said slow pick-up relay as well as a back contact of said slow release stick relay and the winding of said control relay for energizing said control relay, means controlled by said control relay for operating one of said traffic governing devices, a second circuit including a front contact controlled by said control relay and a back contact of said slow release stick relay for energizing said second slow release relay, a third circuit including said conductors and said second source of current and also the windings of said slow release stick relay and said indication relay as well as a front contact of said second slow release relay and a back contact of said slow pick-up relay and also the front contact of said push button circuit controller and controlled by one or another of said railway traffic governing devices and by said control relay for energizing said indication relay and said slow release stick relay, and a stick circuit for said slow release stick relay which is the same as said third circuit except that it includes a contact of said slow release stick relay instead of the front contact of said second slow release relay and is not controlled by said control relay.

23. In combination, a pair of conductors extending from a control point to a remote point, a plurality of railway traffic governing devices at said remote point, a control relay at said remote point, a slow release stick relay, a manually operable push button circuit controller having a front or normally closed contact and a back or normally open contact, an energizing circuit for said control relay including said conductors and controlled by said back contact and by a back contact of said slow release stick relay, an energizing circuit for one of said traffic governing devices controlled by said control relay, an indication device, and a control circuit for said indication device and for said slow release stick relay including said conductors and controlled by one or another of said traffic governing devices and also by the front contact of said push button circuit controller.

24. In combination, a pair of conductors extending from a control point to a remote point, a plurality of railway traffic governing devices at said remote point, a control relay at said remote point, a slow release stick relay, means controlled by said control relay for operating one of said traffic governing devices, an indication device, a circuit controlled by one or another of said railway traffic governing devices and by said control relay for controlling said indication device and said slow release stick relay, a manually operable device, and means controlled by said manually operable device for deenergizing said slow release stick relay and said indication device and for completing a control circuit for energizing said control relay including said conductors and a back contact of said slow release stick relay.

25. In combination, a pair of conductors extending from a control point to a remote point, a plurality of traffic governing devices at said remote point, a circuit including said conductors and controlled by said traffic governing devices for providing a constant indication of the condition of said traffic governing devices, a manually operable circuit controller, means controlled by said manually operable circuit controller for at times transferring said conductors from said indication control to a control circuit for one or more of said traffic governing devices, a plurality of manually operable devices, and means controlled by each of said manually operable devices for supplying said control circuit with current of a distinctive code for selectively controlling a corresponding one of said traffic governing devices.

26. In combination, a pair of conductors extending from a control point to a remote point, a plurality of traffic governing devices at said remote point, a manually operable circuit controller having a normal and a reverse position, a circuit including said conductors and a contact of said manually operable circuit controller in its normal position for providing a constant indication of the condition of said traffic governing devices, means including said conductors and said manually operable circuit controller in its reverse position for completing a circuit for controlling one or more of said traffic governing devices, and means controlled by said circuit controller upon returning to its normal position for automatically restoring said constant indication.

27. In combination, a pair of conductors, a plurality of traffic governing devices, a manually operable circuit controller having a normal and a reverse position, means including said conductors and controlled by said circuit controller in its reverse position for selectively controlling said traffic governing devices, indication apparatus, an indication circuit including said indication apparatus and said conductors and a contact of said manually operable circuit controller in its normal position, and means controlled by said traffic governing devices for supplying current at distinctive codes to said indication circuit for selectively controlling said indication apparatus while said circuit controller is in its normal position and for changing from one code to another in accordance with changes in the condition of said traffic governing devices to automatically cause corresponding changes in said indication apparatus without requiring a change in position of said manually operable circuit controller.

28. A system of five-block automatic signaling comprising a stretch of railway track divided into blocks, a signal for each block capable of displaying six different indications, a control circuit for each signal, means controlled by traffic conditions in five blocks in advance of each signal for energizing said control circuit by continuous current of positive or of negative polarity or for energizing said control circuit by periodically interrupted current of positive or of negative polarity or for energizing said control circuit by alternating current of low frequency of the order of 80 cycles per minute as well as for deenergizing said control circuit, and polar and neutral contacts controlled by each said control circuit for causing the associated signal to display one of its six different indications corresponding to the one of said five forms of current by which said control circuit is energized or corresponding to the deenergized condition of said control circuit.

29. In combination, a control circuit, means for supplying said control circuit with continuous current of positive polarity, means for supplying said control circuit with continuous current of negative polarity, means for supplying said control circuit with periodically varied current of positive polarity, means for supplying said control circuit with periodically varied current of negative polarity, neutral and polar contacts controlled by said control circuit responsive to each of said forms of current, a plurality of railway traffic governing devices, and means controlled by said neutral and polar contacts for selectively controlling said traffic governing devices in a first or a second or a third or a fourth manner according as said control circuit is supplied with continuous current of positive polarity or continuous current of negative polarity or periodically varied current of positive polarity or periodically varied current of negative polarity respectively.

30. In combination, a control circuit, means for supplying said control circuit with continuous current of positive polarity, means for supplying said control circuit with continuous current of negative polarity, means for supplying said control circuit with current of positive polarity periodically varied at a rate of the order of eighty times per minute, means for supplying said control circuit with current of negative polarity periodically varied at a rate of the order of eighty times per minute, neutral and polar contacts controlled by said control circuit responsive to each of said forms of current, a plurality of railway traffic governing devices, and means controlled by said neutral and polar contacts for selectively controlling said traffic governing devices in a first or a second or a third or a fourth manner according as said control circuit is supplied with each of said four forms of current respectively.

31. In combination, a pair of conductors, means for supplying said conductors with periodically varied current of positive polarity, means for supplying said conductors with periodically varied current of negative polarity, means for supplying said conductors with alternating current of low frequency, a neutral and a polarized relay connected in multiple across said conductors and each distinctively responsive to said periodically varied currents and to said alternating current, and a plurality of electrical devices selectively controlled by said neutral and polarized relays.

32. In combination, a pair of conductors, a direct current source for supplying said conductors with constant current of positive polarity, a second direct current source for supplying said conductors with constant current of negative polarity, means for periodically connecting said first and second sources alternately to said conductors, a plurality of electrical devices, and apparatus comprising a neutral relay and a polarized relay each responsive to said constant current of positive polarity and to said constant current of negative polarity and also to said alternated currents for selectively controlling each of said electrical devices.

33. In combination, a pair of conductors, means for supplying said conductors with continuous current of positive polarity, means for supplying said conductors with continuous current of negative polarity, means for supplying said conductors with periodically varied current of positive polarity, means for supplying said conductors with periodically varied current of negative polarity, a neutral and a polarized relay controlled by said currents supplied to said conductors, and electro-responsive apparatus selectively controlled by said neutral and polarized relays in a first or a second or a third or a fourth manner according as said first or second or third or fourth current respectively is supplied to said conductors.

34. In combination, a control circuit, means for supplying said control circuit with continuous current of positive polarity, means for supplying said control circuit with continuous current of negative polarity, means for supplying said control circuit with periodically varied current of positive polarity, means for supplying said control circuit with periodically varied current of negative polarity, neutral and polar contacts controlled by said control circuit, and electro-responsive apparatus selectively controlled by said neutral and polar contacts in a first or a second or a third or a fourth manner according as said first or second or third or fourth current respectively is supplied to said control circuit.

35. In combination, a control circuit, means for supplying said control circuit with a first or a second or a third or a fourth form of current, a neutral contact having a front and a back point and a polar contact having a normal and a reverse position controlled by said control circuit, and electro-responsive apparatus selectively controlled by said neutral and polar contacts in a first or a second or a third or a fourth manner according as said first or second or third or fourth form of current respectively is supplied to said control circuit.

36. In a signalling system, a first station, a second station, a plurality of apparatus units at said second station, a single signalling channel connecting said stations, a receiver at said second station comprising a plurality of line relays selectively responsive to steady and pulsating currents of both polarities and alternating current, means including a transmitter at said first station selectively operable to transmit single impulse signals of steady or pulsating currents of both polarities contemporaneously with alternating current over said signalling channel to operate said receiver, and selecting means responsive to the operation of the receiver for selecting one of said apparatus units corresponding to the character of the single impulse signal transmitted.

37. In combination, a stretch of railway track divided into a plurality of consecutive track sections, a pair of conductors for each section, means for each section for supplying the conductors for the section next in the rear with constant current of a given polarity or with constant current of the opposite polarity or with periodically interrupted current according to traffic conditions in advance, a polarized relay connected to the conductors for each section responsive to the polarity of each form of current supplied to the associated conductors, a neutral relay for each section responsive to constant current or to periodically interrupted current also connected to the associated conductors, and a signal for each section capable of displaying three distinct clear block indications selectively controlled by the associated polarized and neutral relays.

38. In combination, a stretch of railway track divided into a plurality of consecutive track sections, a pair of conductors for each section, means for each section for supplying the conductors for the section next in the rear with constant current of a given polarity or with constant current of the opposite polarity or with periodically interrupted current of said given polarity or with periodically interrupted current of said opposite polarity according to traffic conditions in advance, a polarized relay for each section responsive to the polarity of each form of current receiving current from the associated conductors, a neutral relay for each section responsive either to constant current or to periodically interrupted current also receiving current from the associated conductors, and a signal for each section capable of displaying four distinct clear block indications selectively controlled by the associated polarized and neutral relays.

39. In combination, a stretch of railway track divided into a plurality of consecutive track sections, a pair of conductors for each section, means for each section for supplying the conductors for the section next in the rear with constant or periodically interrupted current of each polarity or with alternating current of low frequency according to traffic conditions in advance, a polarized relay for each section responsive to the polarity of each form of current receiving current from the associated conductors, a neutral relay for each section responsive to each of said forms of current also receiving current from the associated conductors, and a signal for each section capable of displaying five distinct clear block indications selectively controlled by the associated polarized and neutral relays.

40. In combination, a stretch of railway track divided into a plurality of consecutive track sections, a pair of conductors for each section, means for each section for supplying the conductors for the section next in the rear with constant current of a given polarity or with constant current of the opposite polarity or with periodically interrupted current according to traffic conditions in advance, a neutral contact for each section closed at its front point in response to current of either polarity in said conductors and closed at its back point whenever current in said conductors is interrupted, a first and a second auxiliary relay for each section, a circuit for energizing each first auxiliary relay including the neutral contact for its section closed at its back point, a circuit for energizing each second auxiliary relay controlled by the first auxiliary relay for the same section and including the neutral contact for that section closed at its front point, a polar contact for each section selectively controlled according to the polarity of current in said conductors, and a signal for each section capable of displaying three distinct clear block indications which are selectively controlled by the second auxiliary relay and the polar contact for its section.

41. In combination, a stretch of railway track divided into a plurality of consecutive track sections, a pair of conductors for each section, means for each section for supplying the conductors for the section next in the rear with constant current of a given polarity or with constant current of the opposite polarity or with periodically interrupted current of each of said two polarities according to traffic conditions in advance, and a signal for each section capable of displaying four distinct clear block indications which are selectively controlled by said four forms of current received from said conductors.

42. In combination, a stretch of railway track divided into a plurality of consecutive track sections, a pair of conductors for each section, means for each section for supplying the conductors for the section next in the rear with constant current of a given polarity or with constant current of the opposite polarity or with periodically interrupted current of each of said two polarities or with alternating current according to traffic conditions in advance, and a signal for each section capable of displaying five distinct clear block indications which are selectively controlled by said five forms of current received from said conductors.

43. In combination, a stretch of railway track divided into a plurality of consecutive track sections, a pair of conductors for each section, means for each section for supplying the conductors for the section next in the rear with constant current of a given polarity or with constant current of the opposite polarity or with periodically interrupted current according to traffic conditions in advance, a polarized relay for each section responsive to the polarity of constant current carried by the conductors for the associated section, a neutral relay for each section responsive to periodically interrupted current carried by the conductors for the associated section, and a signal for each section capable of displaying three distinct clear block indications selectively controlled by the associated polarized and neutral relays.

44. In combination, a stretch of railway track divided into a plurality of consecutive track sections, a pair of conductors for each section, means for each section for supplying the conductors for the section next in the rear with constant current of a given polarity or with constant current of the opposite polarity or with periodically interrupted current, a polarized relay for each section responsive to the polarity of constant current carried by the conductors for the associated section, a neutral relay for each section responsive to periodically interrupted current carried by the conductors for the associated section, and a signal for each section capable of displaying three distinct clear block indications selectively controlled by the associated polarized and neutral relays.

45. In combination, a stretch of railway track divided into a plurality of consecutive track sections, a pair of conductors for each section, means for each section for supplying the conductors for the section next in the rear with constant or periodically interrupted current of each polarity, electro-responsive means for each section characteristically responsive to each of said four forms of current carried by the conductors for the associated section, and signal means for each section selectively controlled by the electro-responsive means for the same section for displaying each of four distinct clear block indications corresponding to the four forms of current respectively.

46. In combination, a stretch of railway track divided into a plurality of consecutive track sections, a pair of conductors for each section, means for each section for supplying the conductors for the section next in the rear with constant or periodically interrupted current of each polarity or with alternating current of low frequency, electro-responsive means for each section characteristically responsive to each of said five forms of current carried by the conductors for the associated section, and signal means for each section selectively controlled by the electro-responsive means for the same section for displaying each of five distinct clear block indications corresponding to the five forms of current respectively.

47. In combination, a section of railway track having a track circuit including a track relay, a line circuit for said section including a contact of said track relay, a signal controlled by said line circuit and arranged to display a more restrictive or a less restrictive indication according as said line circuit is supplied with direct current or with alternating current, a source of direct current, a device for converting said direct current to alternating current, and means for connecting said line circuit with said direct current source or with said device in accordance with traffic conditions in advance.

HOWARD A. THOMPSON.